(12) United States Patent
Sato et al.

(10) Patent No.: US 6,567,179 B1
(45) Date of Patent: *May 20, 2003

(54) SYSTEM FOR CONTROLLING COMMUNICATION BETWEEN A PRINTER AND AN EXTERNAL HOST COMPUTER

(75) Inventors: Yukimasa Sato, Kawasaki (JP); Akio Sugaya, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,049

(22) Filed: Sep. 30, 1997

(30) Foreign Application Priority Data

Oct. 4, 1996 (JP) .............................. 8-264247

(51) Int. Cl.$^7$ .............................................. G06F 15/00
(52) U.S. Cl. ..................................... 358/1.15; 358/1.14
(58) Field of Search ................................. 395/106, 112, 395/113, 114, 115, 116, 117; 370/469; 358/1.6, 1.13, 1.14, 1.15, 1.16, 1.17, 1.18

(56) References Cited

U.S. PATENT DOCUMENTS

| | | | | |
|---|---|---|---|---|
| 4,991,972 A | * | 2/1991 | Ikenoue et al. ............. 395/113 |
| 5,150,455 A | * | 9/1992 | Morikawa et al. .......... 358/1.15 |
| 5,428,714 A | * | 6/1995 | Yawata ....................... 358/1.13 |
| 5,550,957 A | * | 8/1996 | Davidson, Jr. et al. ..... 358/1.15 |
| 5,594,653 A | * | 1/1997 | Akiyama et al. ............ 700/117 |
| 5,636,333 A | * | 6/1997 | Davidson, Jr. et al. ..... 358/1.15 |
| 5,652,830 A | * | 7/1997 | Yamamoto et al. ......... 358/1.16 |
| 5,768,485 A | * | 6/1998 | Shimizu ..................... 358/1.17 |
| 5,867,636 A | * | 2/1999 | Walker ........................ 395/114 |
| 6,006,090 A | * | 12/1999 | Coleman et al. ............ 455/432 |

FOREIGN PATENT DOCUMENTS

| | | | |
|---|---|---|---|
| EP | 0598513 | 5/1994 | ............ G06F/3/12 |
| EP | 0652533 | 5/1995 | ......... G06K/15/00 |
| EP | 0653700 | 5/1995 | ............ G06F/3/12 |

* cited by examiner

Primary Examiner—Gabriel Garcia
(74) Attorney, Agent, or Firm—Fitzpatrick, Cella, Harper & Scinto

(57) ABSTRACT

A control technique for communicating communication data including a print data packet and a control data packet in independent communication protocols controls the job for page data being printed obtained from the print packet according to information from the control packet. The type of protocol used in communication with a host computer is identified. The communication data that is received according to the type of protocol is sorted by the type of data, namely, into the control data packet and print data packet. A formatter analyzer analyze the print data and converts it into bit map data printable on a printer engine. A control command analyzer executes a predetermined command.

32 Claims, 13 Drawing Sheets

BLOCK DIAGRAM OF PRINTER SYSTEM

BLOCK DIAGRAM OF PRINTER SYSTEM

DATA BLOCK IN PROTOCOL C

DATA BLOCK IN PROTOCOL D

FIRST PRINTING PROCESS

SECOND EMBODIMENT

THIRD EMBODIMENT

FOURTH EMBODIMENT

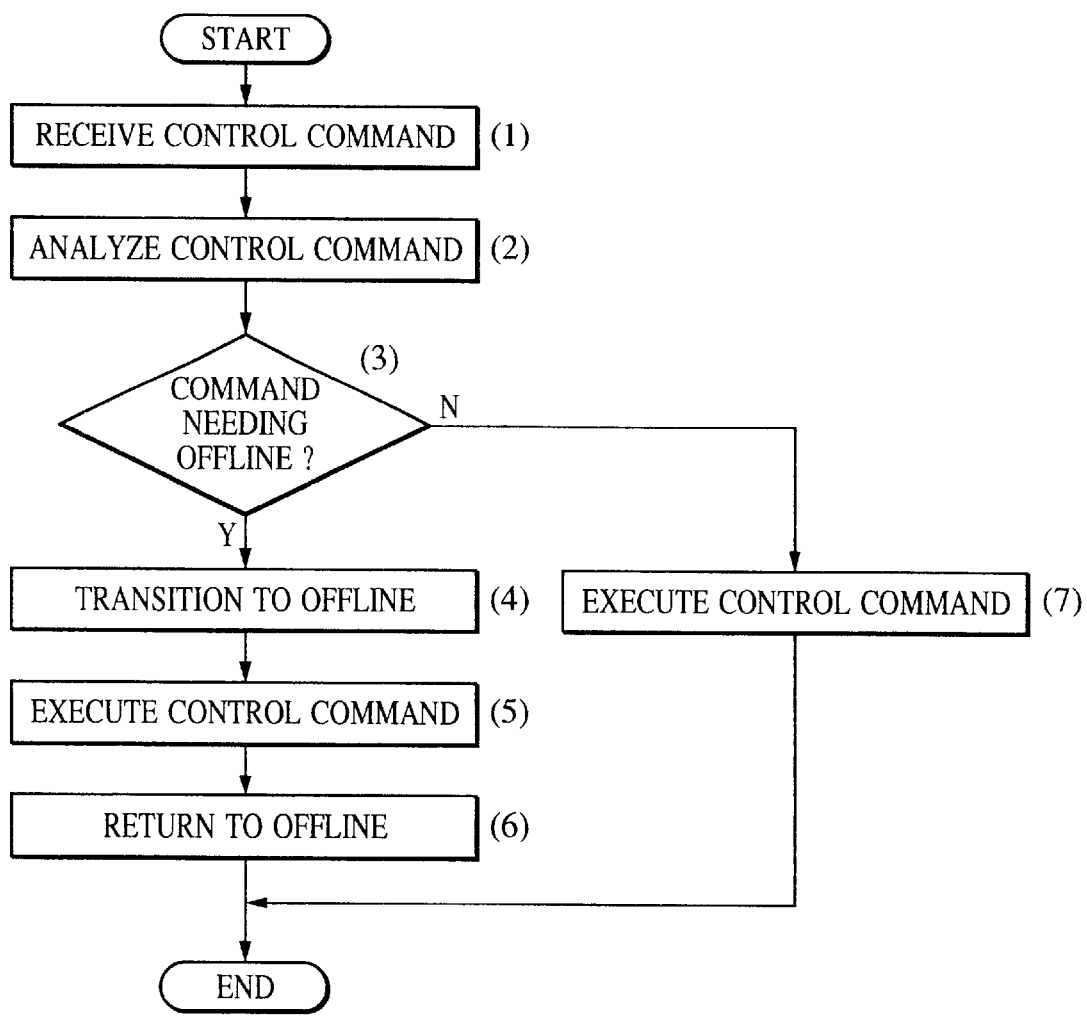

FIG. 14

MAP

STORAGE MEDIUM SUCH AS FD/CD-ROM

| DIRECTORY INFORMATION |
|---|
| FIRST DATA PROCESSING PROGRAM<br>GROUP OF PROGRAM CODES CORRESPONDING TO STEPS IN FLOW DIAGRAM IN FIG. 4 |
| SECOND DATA PROCESSING PROGRAM<br>GROUP OF PROGRAM CODES CORRESPONDING TO STEPS IN FLOW DIAGRAM IN FIG. 5 |
| THIRD DATA PROCESSING PROGRAM<br>GROUP OF PROGRAM CODES CORRESPONDING TO STEPS IN FLOW DIAGRAM IN FIG. 6 |
| FOURTH DATA PROCESSING PROGRAM<br>GROUP OF PROGRAM CODES CORRESPONDING TO STEPS IN FLOW DIAGRAM IN FIG. 8 |
| FIFTH DATA PROCESSING PROGRAM<br>GROUP OF PROGRAM CODES CORRESPONDING TO STEPS IN FLOW DIAGRAM IN FIG. 9 |
| SIXTH DATA PROCESSING PROGRAM<br>GROUP OF PROGRAM CODES CORRESPONDING TO STEPS IN FLOW DIAGRAM IN FIG. 11 |
| SEVENTH DATA PROCESSING PROGRAM<br>GROUP OF PROGRAM CODES CORRESPONDING TO STEPS IN FLOW DIAGRAM IN FIG. 13 |
|  |

MEMORY MAP OF STORAGE MEDIUM

SYSTEM FOR CONTROLLING COMMUNICATION BETWEEN A PRINTER AND AN EXTERNAL HOST COMPUTER

BACKGROUND OF THE INVENTION

1. Field of the Invention

The present invention relates to a method and apparatus for controlling output, in which printing process is controlled in response to communication data received from an information processing apparatus via a predetermined communication medium and also relates to a storage medium for storing a program that is readable by a computer.

2. Description of the Related Art

In image processing apparatuses (such as printers), one communication protocol is today used in one communication interface for communication with a host computer, and control data and print data are exchanged through the same communication interface on the same protocol.

Since print data and control data input based on the same communication protocol are sequentially processed in one communication interface, the control data is executed against the print data that comes in succession to the control data. Print job information is referenced when a print page is created, and an output page is not associated with job information.

Since the control data and print data are exchanged in the same communication, no control command is received from the host computer when the communication status between a printer and a host computer is transitioned to an offline state. Control command performed in the offline state is executed but not by a control command from the host computer.

A macro function execution after the communication status between the printer and the computer is transitioned to an offline state is usually executed after a transition to the offline and the communication status remains there.

Even when the host computer is capable of controlling the printer by a command, the printer remains unable to notify the host computer of a status or the like because of disabled data communication when a process that has to be carried with the printer at the offline state is attempted.

Even if a command of status return request is issued during the online state, the printer remains unable to notify the host computer of a status or the like because of disabled data communication when a process that has to be carried with the printer at the offline state is attempted.

Since the communication control between the host computer and printer is organized as described above in the conventional printing system, only a single data communication is permitted between the host computer and printer, and it is impossible to receive both control data and print data in parallel and in an interruptible manner. When the printer is operated using its operation panel, the printer is unable to process control data (command) though the control data can be received together with the print data in parallel and in an interruptible manner.

When the system shifts to the offline state at the occurrence of a print error, the offline state is applied to the control data, and no control is permitted during the offline state.

In the communication with the host computer, the print data and control data are received using the single protocol and are processed sequentially in the order of their reception. Analysis and processing of the control data must wait until the end of analysis and processing of the print data. For example, even when the printer receives control data that requires the printer to report its state to the host computer, the printer remains unable to respond until the end of analysis and processing of the print data.

Since an intermediate output page created by an input print job has no information that is associated with the area of one job, input jobs cannot be selectively controlled. Initial information of the apparatus at the start of a job is not stored; thus, when a particular input job is selectively canceled, the printer setting cannot be restored to the setting during the start of the job.

When an offline command from the host computer causes the printer to transition to the offline state, no further data communication is carried out, and the host computer cannot request a process step at the offline state.

In the macro function execution after the transition to the offline, some of control processes offline require one-time execution only, such as a reset process. These control commands are executed at each offline. For this reason, these commands need deleting each time a macro is executed after the offline.

After the printer transitions to the offline state in response to a command from the host computer, a control command from the host computer cannot get the printer back to the online. The operation panel needs to be operated to revert back to the online state, and this extra operation inconveniences a user.

When the host computer controls the printer by a control command, a process that needs to be carried out during the offline state cannot be executed with the data communication disabled. An on-screen operation panel, if available, on the host computer corresponding to the actual printer operation panel does not accept an input related to a process that needs to be carried out offline.

SUMMARY OF THE INVENTION

The present invention has been developed to resolve the above problems. A first object of the present invention is to provide a method and apparatus which process both print data and control data contained in communication data in parallel and in an interruptible manner by receiving the communication data based on at least two protocols. A second object of the present invention is to provide a method and apparatus which select and process already received print job data by a subsequent control command by linking and then storing both job information and output page data contained in the print job data and printer setting, and which, after the process, revert back to a printer state prior to the start of the print job. A third object of the present invention is to provide a method and apparatus which performs a desired process after transitioning to an offline state in response to an offline command from a host computer. A fourth object of the present invention is to provide a method and apparatus which restrict the number of executions of a macro executed at the transition to the offline state. A fifth object of the present invention is to provide a method and apparatus which are capable of returning back to an online state after executing a predetermined control command subsequent to the transition to the offline state in response to an offline command from the host computer and to provide a storage medium for storing a program a computer can read.

According to a first aspect of the present invention, the printing control device comprises communication control means which performs a plurality of data communications with an information processing apparatus via a predetermined communication medium by using at least two protocols in accordance with a predetermined hierarchical level; sorting means for sorting, according the type of data, communication data that is received on a protocol by protocol basis of the protocols the communication control means uses in communication with the information processing apparatus; and a plurality of data processing means for performing different data processings to the different data sorted by the sorting means.

According to a second aspect of the present invention, the sorting means sorts the communication data into control data and print data.

According to a third aspect of the present invention, one of the data processing means performs a predetermined data analysis process to the print data sorted from the communication data by the sorting means to create a bit map a printing module can print out.

According to a fourth aspect of the present invention, one of the data processing means analyzes the control data sorted from the communication data by the sorting means to execute a predetermined control command.

According to a fifth aspect of the present invention, the hierarchical level of the protocol is a transport layer or higher.

According to a sixth aspect of the present invention, the communication control means performs a plurality of communications in parallel or in an interruptible manner using at least two protocols in accordance with the predetermined hierarchical level.

According to a seventh aspect of the present invention, the printing control device comprises communication control means which performs a plurality of data communications with an information processing apparatus via a predetermined communication medium by using at least two protocols in accordance with a predetermined hierarchical level; sorting means for sorting, into print data and control data, communication data that is received on a protocol by protocol basis of the protocols the communication control means uses in communication with the information processing apparatus; first analyzing means for analyzing, on a per job basis, the print data sorted by the sorting means to create job management information used to determine the area of each job and output page data for each job; memory means for linking and storing the job management information and the output page data based on the job management information; and second analyzing means for analyzing the control data sorted by the sorting means to check required job information against the job management information stored in the memory means and to select a job to be processed, wherein a series of the output page data which the first analyzing means retrieves by referencing the job management information of the job to be processed are processed according to control data, based on the job to be processed selected by the second analyzing means.

According to an eighth aspect of the present invention, the memory means stores the initial state of a printing apparatus at the job start of each piece of job management information.

According to a ninth aspect of the present invention, after a series of the output page data which the first analyzing means retrieves by referencing the job management information of the job to be processed are processed according to control data, based on the job to be processed selected by the second analyzing means, the status of the printing apparatus is recovered to the initial state of the printing apparatus at the job start of each piece of job management information stored in the memory means.

According to a tenth aspect of the present invention, the control data is a delete command.

According to an eleventh aspect of the present invention, the printing control device communicating with an information processing apparatus via a predetermined communication medium, comprises macro memory means for storing a plurality of macros to be executed, when a communication status with a information processing apparatus is transitioned to an offline state in response to a control command received from the information processing apparatus; and offline macro means for executing one of the macros stored in the macro memory means specified, when the communication status is transitioned to the offline state.

According to a twelfth aspect of the present invention, the printing control device comprises state hold means for holding an online transition flag for transitioning to an online state, after the communication status with the information processing apparatus is transitioned to the offline state subsequent to the execution of the macro by the macro means based on the control command from the information processing apparatus; and automatic online transition means for returning the communication status with the information processing apparatus to the online state based on the state of the online transition flag stored in the state hold means.

According to a thirteenth aspect of the present invention, the printing control device comprises macro effective area memory means for storing an effective area within which the macro is re-executed; effective area determining means for determining whether the area corresponding to the macro executed by the offline macro means is the effective area; and effective macro flag memory means for storing an effective flag indicating that the macro which the offline macro means executes based on the determination result of the effective area determining means is an effective macro to be re-executed, wherein the offline macro means restricts the re-execution of the macro based on the effective flag stored in the effective macro flag memory means.

According to a fourteenth aspect of the present invention, the printing control device, which communicates with an information processing apparatus via a predetermined communication medium, comprises analyzing means for analyzing the type of a control command received from the information processing apparatus to determine whether the control command is a command to be executed after transitioning to an offline state; offline transition means for executing the command to be executed after transitioning to the offline state, after the communication status with the information processing apparatus is transitioned to the offline state based on the determination result of the analyzing means; and return-to-online means for returning the communication status with the information processing apparatus to an online state after the offline transition means executes the command to be executed after transitioning to the offline state.

According to a fifteenth aspect of the present invention, the printing control method, which controls printing process based on communication data received from an information processing apparatus via a predetermined communication medium, comprises the step of sorting, into different types of data, communication data that is received on a protocol by protocol basis, wherein the communication data is received using at least two protocols in accordance with a predetermined hierarchical level; and the step of performing a plurality of different data processings to the different data sorted.

According to a sixteenth aspect of the present invention, the storage medium, which stores a program that is read by a computer which controls printing process based on communication data received from an information processing apparatus via a predetermined communication medium, stores a program comprising the step of sorting, into different types of data, communication data that is received on a protocol by protocol basis, wherein the communication data is received using at least two protocols in accordance with a predetermined hierarchical level; and the step of performing a plurality of different data processings to the different data sorted.

According to a seventeenth aspect of the present invention, the printing control method which controls printing process based on communication data received from an information processing apparatus via a predetermined communication medium, comprises the step of sorting, into different types of data, communication data that is received on a protocol by protocol basis, wherein the communication data is received using at least two protocols in accordance with a predetermined hierarchical level; the step of registering in which sorted print data is analyzed on a per job basis to link and store, in a memory, job management information for determining the area of each job and output page data for each job; the step of selecting a job to be processed by analyzing control data sorted by the sorting means to check required job information against the job management information stored in the memory and to select a job to be processed; and the step of data processing in which a series of the output page data which are retrieved by referencing the job management information of the job to be processed are processed according to control data, based on the selected job to be processed.

According to an eighteenth aspect of the present invention, the storage medium, which stores a program that is read by a computer that controls printing process based on communication data received from an information processing apparatus via a predetermined communication medium, stores a program comprising the step of sorting, into different types of data, communication data that is received on a protocol by protocol basis, wherein the communication data is received using at least two protocols in accordance with a predetermined hierarchical level; the step of registering in which sorted print data is analyzed on a per job basis to link and store, in a memory, job management information for determining the area of each job and output page data for each job; the step of selecting a job to be processed by analyzing control data sorted by the sorting means to check required job information against the job management information stored in the memory and to select a job to be processed; and the step of data processing in which a series of the output page data which are retrieved by referencing the job management information of the job to be processed are processed according to control data based on the selected job to be processed.

According to a nineteenth aspect of the present invention, the printing control method, which controls printing process based on communication data received from an information processing apparatus via a predetermined communication medium, comprises the step of transitioning to an offline state the communication status with the information processing apparatus in response to a control command received from the information processing apparatus; the step of macro executing in which an effective macro is retrieved and executed after transitioniong to the offline state; the step of state holding an online transition flag for transitioning to an online state after the communication status with the information processing apparatus is transitioned to the offline state; and the step of transitioning the communication status with the information processing apparatus to the online state based on the state of the online transition flag stored.

According to a twentieth aspect of the present invention, the storage medium which stores a program that is read by a computer that controls printing process based on communication data received from an information processing apparatus via a predetermined communication medium, stores a program comprising the step of transitioning to an offline state the communication status with the information processing apparatus in response to a control command received from the information processing apparatus; the step of macro executing in which an effective macro is retrieved and executed after transitioniong to the offline state; the step of state holding an online transition flag for transitioning to an online state after the communication status with the information processing apparatus is transitioned to the offline state; and the step of transitioning the communication status with the information processing apparatus to the online state based on the state of the online transition flag stored.

According to a twenty-first aspect of the present invention, the printing control method, which controls printing process based on communication data received from an information processing apparatus via a predetermined communication medium, comprises the step of analyzing the type of a control command received from the information processing apparatus to determine whether the control command is a command to be executed after transitioning to an offline state; the step of transitioning in which the command to be executed after transitioning to the offline state is executed after the communication status with the information processing apparatus is transitioned to the offline state based on the determination result; and the step of return to the online state in which the communication status with the information processing apparatus is transitioned to an online state after the command to be executed after transitioning to the offline state is executed.

According to a twenty-second aspect of the present invention, the storage medium, which stores a program that is read by a computer that controls printing process based on communication data received from an information processing apparatus via a predetermined communication medium, stores a program comprising the step of analyzing the type of a control command received from the information processing apparatus to determine whether the control command is a command to be executed after transitioning to an offline state; the step of transitioning in which the command to be executed after transitioning to the offline state is executed after the communication status with the information processing apparatus is transitioned to the offline state based on the determination result; and the step of return to the online state in which the communication status with the information processing apparatus is transitioned to an online state after the command to be executed after transitioning to the offline state is executed.

BRIEF DESCRIPTION OF THE DRAWINGS

FIG. 13 is a flow diagram illustrating a seventh printing process performed by the printing control device of the present invention; and FIG. 14 is an explanatory diagram illustrating the memory map of a storage medium for storing a variety of data processing programs the printing control device of the present invention can read.

DESCRIPTION OF THE PREFERRED EMBODIMENTS

First Embodiment

Figure 1:
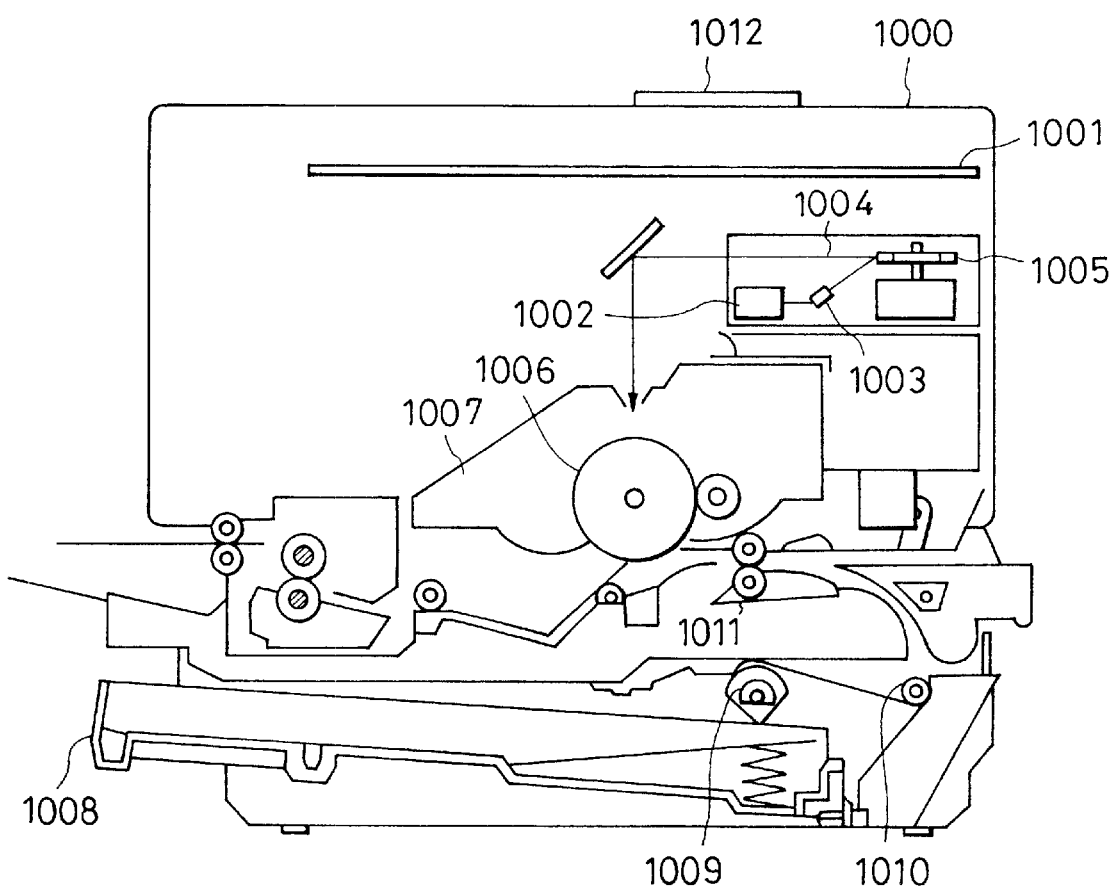
FIG. 1 is a sectional view showing a laser-beam printer which incorporates the embodiments of the present invention.

Referring to FIG. 1, the construction of a laser-beam printer that incorporates a first embodiment of the present invention is discussed before the description of a first embodiment.

FIG. 1 is a sectional view of the laser-beam printer that incorporates the first embodiment. The laser-beam printer permits an unshown source of data to register character patterns and form data.

Figure 2:
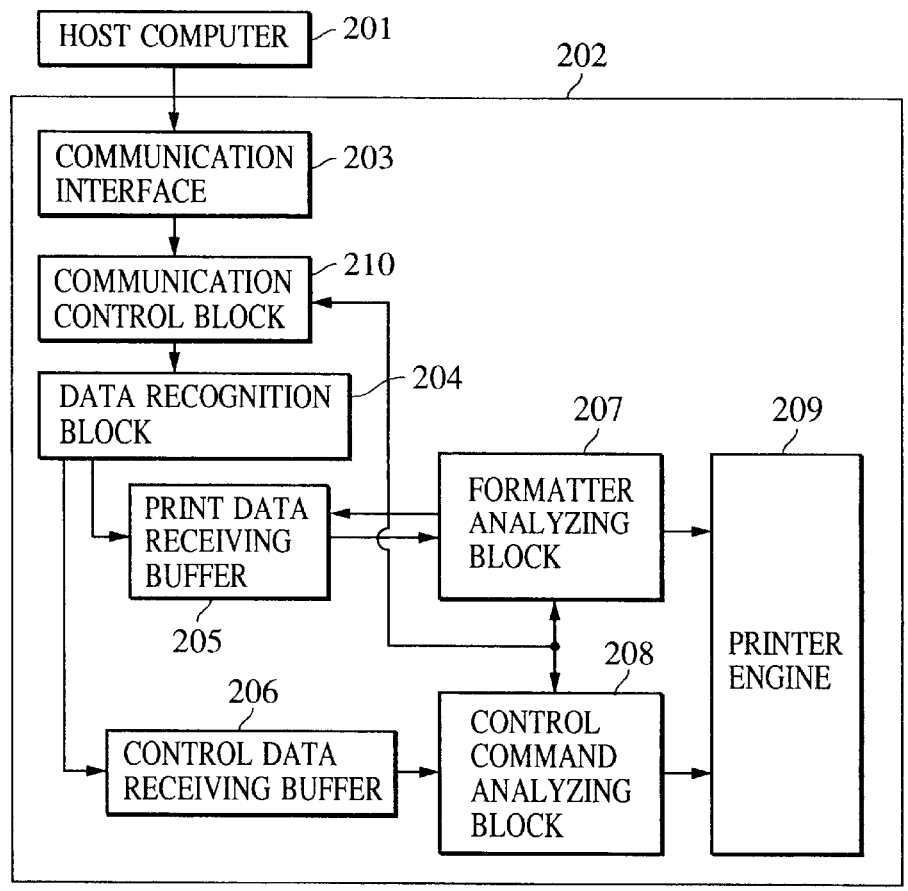
FIG. 2 is a block diagram showing a printing system which incorporates a first embodiment of the printing control device of the present invention.

The laser-beam printer (LBP) 1000 is connected to an external apparatus as shown in FIG. 2. The laser-beam printer 1000 receives and stores text information (character code), form information or macro instruction supplied by the external apparatus such as a host computer, creates a character pattern and form pattern according these pieces of information, and forms an image on a recording paper as a recording medium. Also shown are an operation panel 1012 on which operation switches and LED indicators for indicating the status of the printer are mounted, and a printer control unit 1001 for controlling generally LBP 1000 and analyzing text information and the like supplied by the host computer. The printer control unit 1001 chiefly converts text information into a video signal of a character pattern corresponding to the text information, and outputs the video signal to a laser driver 1002. The laser driver 1002 is a circuit which switches on and off a laser beam 1004 emitted by a semiconductor laser 1003 in response to the video signal input. The laser beam 1004 is deflected leftward and rightward by a rotating polygon mirror 1005 to scan a photoconductive drum 1006. An electrostatic latent image of a character pattern is thus formed on the photoconductive drum 1006. LBP 1000 has CPU, and memories, such as ROM, RAM, which store programs depicted by flow diagrams and are readable by a computer.

The latent image is developed on the surface of the photoconductive drum 1006 by a development unit 1007 and is then transferred to the recording paper. The recording paper is typically cut sheets, and the cut sheets are held in a paper cassette 1008 mounted in the apparatus 1000. The cut sheets are picked up into the apparatus by a feed roller 1009 and a transport roller 1010 and 1011, and fed to the photoconductive drum 1006.

FIG. 2 is a block diagram of a printing system which incorporates the printing control device according to the first embodiment of the present invention. A host computer 201 and a printer 202 are connected via a network or the like to permit communication therebetween.

As shown, the host computer 201 sends, via a predetermined interface to the printer 202, print information, including print data and control data, created in the course of executing an application program.

The printing apparatus (printer) 202 comprises a communication interface 203, a data recognition block 204, a print data receiving buffer 205, a control data receiving buffer 206, a formatter analyzing block 207, a control command analyzing block 208, a printer engine 209 and a communication control block 210.

In this embodiment, the communication interface 203 functioning as the communication control means perform communication control at the physical layer in communication protocol control such as TCP/IP, and transfers received communication data to the communication control block 210 functioning as protocol recognition means in this embodiment. The communication control block 210 identifies the protocol, controls communication with the host computer 201 via the communication interface 203 according to each protocol, and sends the communication data to the data recognition block 204 functioning as protocol sorting means in this embodiment. The data recognition block 204 sorts the communication data coming in from the communication control block 210, according to the type of protocol, and then sends sorted data to their respective analyzing blocks. In this embodiment, the data recognition block 204 sends them to the formatter analyzing block 207 and control command analyzing block 208 via the respective receiving buffers.

The print data receiving buffer 205 buffers the print data contained in the communication data coming in from the communication interface 203. The control data receiving buffer 206 buffers the control data contained in the communication data coming in from the communication interface 203.

The formatter analyzing block 207 analyzes the print information received from the host computer 201 to create a print image and sends it to the printer engine 209. The formatter analyzing block 207 is provided with CPU, RAM and ROM. The control command analyzing block 208 analyzes the control command in the communication data received from the host computer 201. The printer engine 209 forms on the recording medium a permanent image of the print image formed through an electrophotographic process shown in FIG. 1.

Figure 3A:
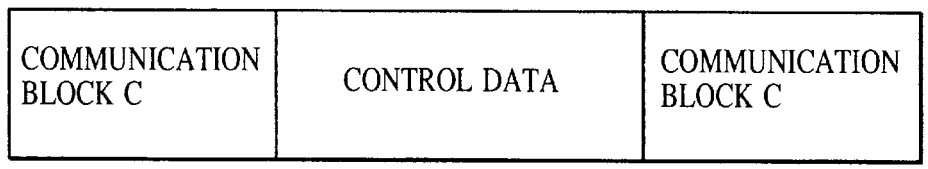
FIG. 3 shows an example of a packet in communication data a communication control block shown in FIG. 2 transfers to a data recognition block.
Figure 3B:
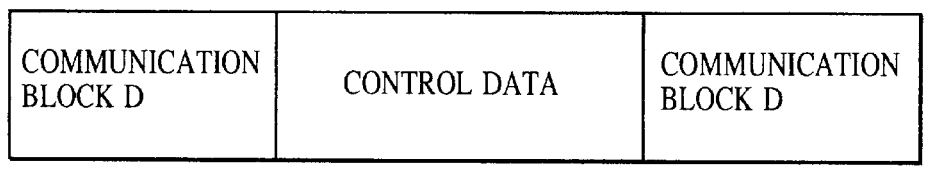

FIGS. 3A and 3B show packets of communication data the communication control block 210 shown in FIG. 2 transfers to the data recognition block 204. FIG. 3A shows a data block according to Protocol C and FIG. 3B shows a data block according to Protocol D.

Figure 4:
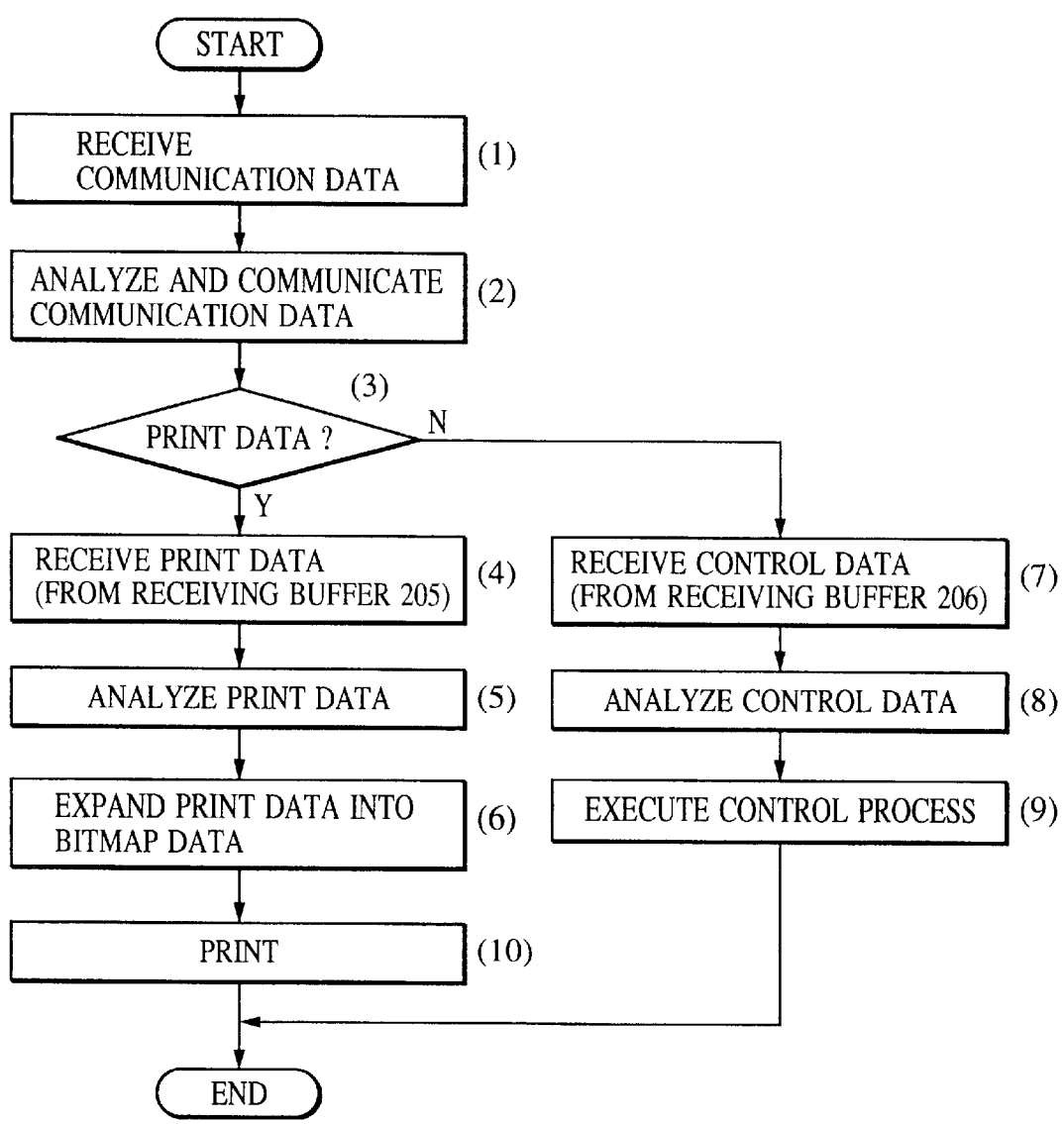
FIG. 4 is a flow diagram illustrating a first printing process performed by the printing control device of the present invention.

Referring to a flow diagram in FIG. 4, the printing process operation of the printing control device of the present invention is discussed.

FIG. 4 is the flow diagram showing a first printing process of the printing control device of the present invention. The steps in the process are designated (1)–(10), and correspond to the process of printing information sent from the host computer 201 to the printer 202 (namely, the data processing shown in FIG. 2 performed by the communication interface 203, communication control block 210, data recognition block 204, formatter analyzing block 207, and control command analyzing block 208).

The communication interface 203 receives the communication data (1), and the communication control block 210 identifies the protocol of the communication data and communicates with the host computer 201 (2). The communication control block 210 sends to the data recognition block 204 the communication data and type of protocol, and the data recognition block 204 determines according to the protocol whether the incoming data is print data or control data (3). When the data is identified as the print data, the data recognition block 204 sends the print data to the print data receiving buffer 205 (4). The formatter analyzing block 207 analyzes the print data stored in the print data receiving buffer 205 (5), expands it into bit map data printable by the printer engine 209 (6), and sends the bit map data to the printer engine 209. In response to the incoming bit map data, the printer engine 209 prints (10), completing the first printing process.

When the communication data is identified as the control data in step (3), the control data receiving buffer 206 receives and stores the control data (7). The control command analyzing block 208 analyzes the control data stored in the control data receiving buffer 206, and sends control information to relevant blocks according the control command analyzed (8), and the relevant blocks perform respective control processes based on the control information (9), completing the first printing process.

Figure 5:
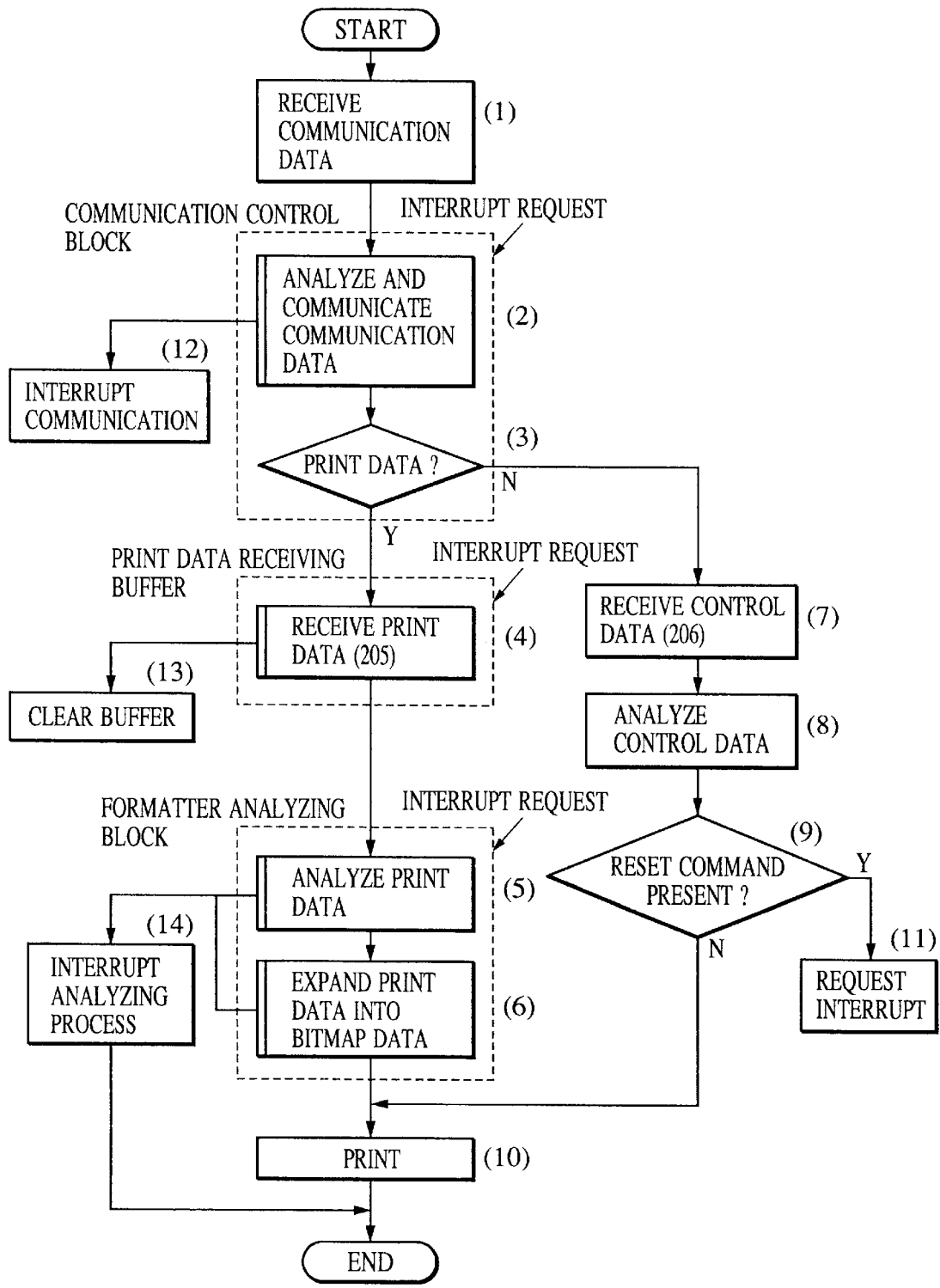
FIG. 5 is a flow diagram illustrating a second printing process performed by the printing control device of the present invention.

Referring a flow diagram in FIG. 5, a second printing process of the printing control device of the present invention is now discussed.

FIG. 5 is a flow diagram illustrating the second printing process of the printing control device of the present invention. The steps in the process are designated (1)–(14), and correspond to the reset process carried out by the control command analyzing block 208 shown in FIG. 2.

When the communication interface 203 receives the communication data from the host computer 201 (1), the communication control block 210 identifies the protocol of the communication data and communicates with the host computer 201 (2). The communication control block 210 sends to the data recognition block 204 the communication data and type of protocol, and the data recognition block 204 determines according to the protocol whether the incoming data is print data or control data (3). When the data is identified as the print data, the data recognition block 204 sends the print data to the print data receiving buffer 205 (4). The formatter analyzing block 207 analyzes the print data stored in the print data receiving buffer 205 (5), and expands it into bit map data printable by the printer engine 209 according to the analysis result (6).

The bit map data is transferred to the printer engine 209. The printer engine 209 prints based on the bit map data (10), completing the second printing process.

When the data recognition block 204 identifies the communication data as the control data in step (3), the control data receiving buffer 206 receives and stores the control data (7). The formatter analyzing block 207 analyzes the control data stored in the control data receiving buffer 206 (8), and determines whether the control data contains a reset command (9). When no reset command is found (NO case), the process goes to step (10). When a reset command is found (YES case), the reset command (interrupt command) is sent to the communication control block 210 and formatter analyzing block 207, and a buffer clear command is sent to the print data receiving buffer 205 (11).

In response to the reset request, the formatter analyzing block 207 and communication control block 210 shift to reset processing. The formatter analyzing block 207 interrupts the analyzing process (14) while the communication control block 210 suspends the communication with the host computer 201 (12). In response to the buffer clear command, the print data receiving buffer 205 clears a receive buffer secured in unshown memory resources such as RAM (13).

The printer engine 209 is free from the effect of the reset in this embodiment. The detail of the reset process in each relevant block is discussed referring to a flow diagram shown in FIG. 6.

Figure 6:
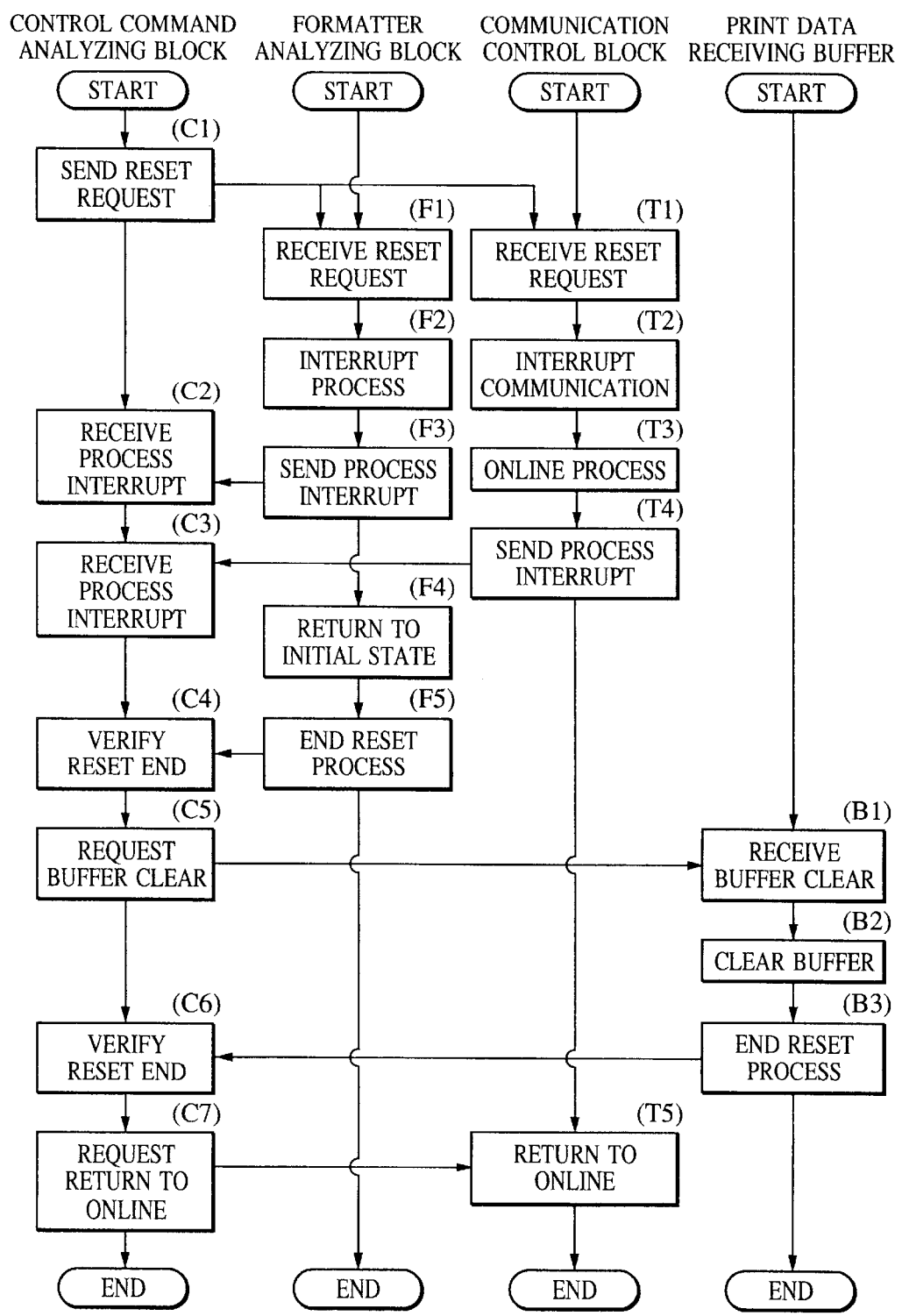
FIG. 6 is a flow diagram illustrating a third printing process performed by the printing control device of the present invention.

FIG. 6 is a flow diagram showing a third printing process of the printing control device of the present invention, and corresponds to the reset process performed by the communication control block 210, formatter analyzing block 207, control command analyzing block 208, and print data receiving buffer 205. The steps of the control command analyzing block 208 are designated (C1)–(C7), the steps of the formatter analyzing block 207 are designated (F1)–(F5), steps of the communication control block 210 are designated (T1)–(T5), and the steps of the print data receiving buffer 205 are designated (B1)–(B3).

The control command analyzing block 208 issues a reset request to the formatter analyzing block 207 and communication control block 210 (C1).

The control command analyzing block 208 waits for a reply from the formatter analyzing block 207 and communication control block 210 indicating that the processes under progress are interrupted. In succession to receiving the replies of process interrupt (C2), (C3), the control command analyzing block 208 waits for a reply of reset end from the formatter analyzing block 207 (C4). The control command analyzing block 208 issues a buffer clear request to the print data receiving buffer 205 (C5), and waits for a reply of reset end from the print data receiving buffer 205. Upon verifying the reset end (C6), namely upon receiving the replies of reset end from the relevant blocks, the control command analyzing block 208 requests the communication control block 210 to return to the online state (C7), thus completing the process. The order of reception of process interrupts in steps (C2) and (C3) is not important.

Upon receiving the reset request from the control command analyzing block 208 (F1), the formatter analyzing block 207 suspends the process currently in progress (F2). The formatter analyzing block 207 reports the process interrupt to the control command analyzing block 208 (F3), performs the reset process, reverts to an initial state (F4), and reports the reset process end to the control command analyzing block 208 (F5), completing the process.

Upon receiving the reset request from the control command analyzing block 208 (T1), the communication control block 210 requests the host computer 201 to interrupt the communication of print data currently in progress, performing an interrupt process (T2). The communication control block 210 executes an offline process to set the communication of only the print data to the offline state (T3), and reports the process interrupt to the control command analyzing block 208 (T4). Upon receiving the reset process end reporting from the control command analyzing block 208, the communication control block 210 returns the communication process of the print data to the online state (T5), and completes the process. Although the online process is automatically recovered in this embodiment, control may be optionally devised not to revert to the online process.

When the print data receiving buffer 205 receives a buffer clear request from the control command analyzing block 208 (B1), the print data receiving buffer 205 clears a receiving buffer secured in unshown memory resources such as RAM (B2). The print data receiving buffer 205 reports a clear end to the control command analyzing block 208 (B3), completing the process.

Referring to FIG. 2, the correspondence between this embodiment and each means specified in the first through sixth aspects of the present invention, and the advantages of the embodiment are discussed.

According to the first to sixth aspects of the present invention, the printing control device comprises communication control means (communication control block 210) which performs a plurality of data communications with an information processing apparatus (host computer 201) via a predetermined communication medium (interface and network) by using at least two protocols in accordance with a predetermined hierarchical level; sorting means (data recognition block 204) for sorting, according the type of data, communication data that is received on a protocol by protocol basis of the protocols the communication control means uses in communication with the information processing apparatus; and a plurality of data processing means (formatter analyzing block 207, control command analyzing block 208) for performing different data processings to the different data sorted by the sorting means. The communication control block 210 performs a plurality of communications with the host computer 201 via the predetermined communication medium using at least two different protocols at a predetermined hierarchical level, for example, at the transport layer or higher. The data recognition block 204 identifies the type of protocol used in communication with the host computer 201. The data recognition block 204 sorts into different types of data, for example, control data and print data, the communication data that is received according to the type of protocol. The formatter analyzing block 207 performs a predetermined data analyzing process to the print data and outputs a bit map data printable on the printer engine 209, while the control command analyzing block 208 executes a predetermined control command. The print data and control data are thus processed in parallel or in an interruptible manner.

Referring to FIG. 5, the correspondence between this embodiment and each step specified in the fifteenth and sixteenth aspects of the present invention, and the advantages of the embodiment are discussed.

According to the fifteenth aspect of the present invention, the printing control method, which controls printing process based on communication data received from an information processing apparatus via a predetermined communication medium, comprises the step of sorting (steps (2), (3), (4), and (7) in FIG. 5), into different types of data, communication data that is received on a protocol by protocol basis, wherein the communication data is received using at least two protocols in accordance with a predetermined hierarchical level; and the step of performing a plurality of different data processings (steps (5), (6), and (10) in FIG. 5, and steps (7)–(9) in FIG. 5) to the different data sorted. The control program including these steps, stored in an unshown memory resource, are executed by unshown CPU. The print data and control data are thus processed in parallel or in an interruptible manner.

According to the sixteenth aspect of the present invention, the storage medium, which stores a program that is read by a computer which controls printing process based on communication data received from an information processing apparatus via a predetermined communication medium, stores a program comprising the step of sorting (steps (2), (3), (4), and (7) in FIG. 5), into different types of data, communication data that is received on a protocol by protocol basis, wherein the communication data is received using at least two protocols in accordance with a predetermined hierarchical level; and the step of performing a plurality of different data processings (steps (5), (6), and (10) in FIG. 5, and steps (7)–(9) in FIG. 5) to the different data sorted. A program code corresponding to the steps in FIG. 5 is stored in an unshown memory resource, and CPU in the printing control device of the printer 202 reads the program code stored in the memory resource and executes the program. This arrangement falls within the scope of the present invention.

Second Embodiment

Figure 7:
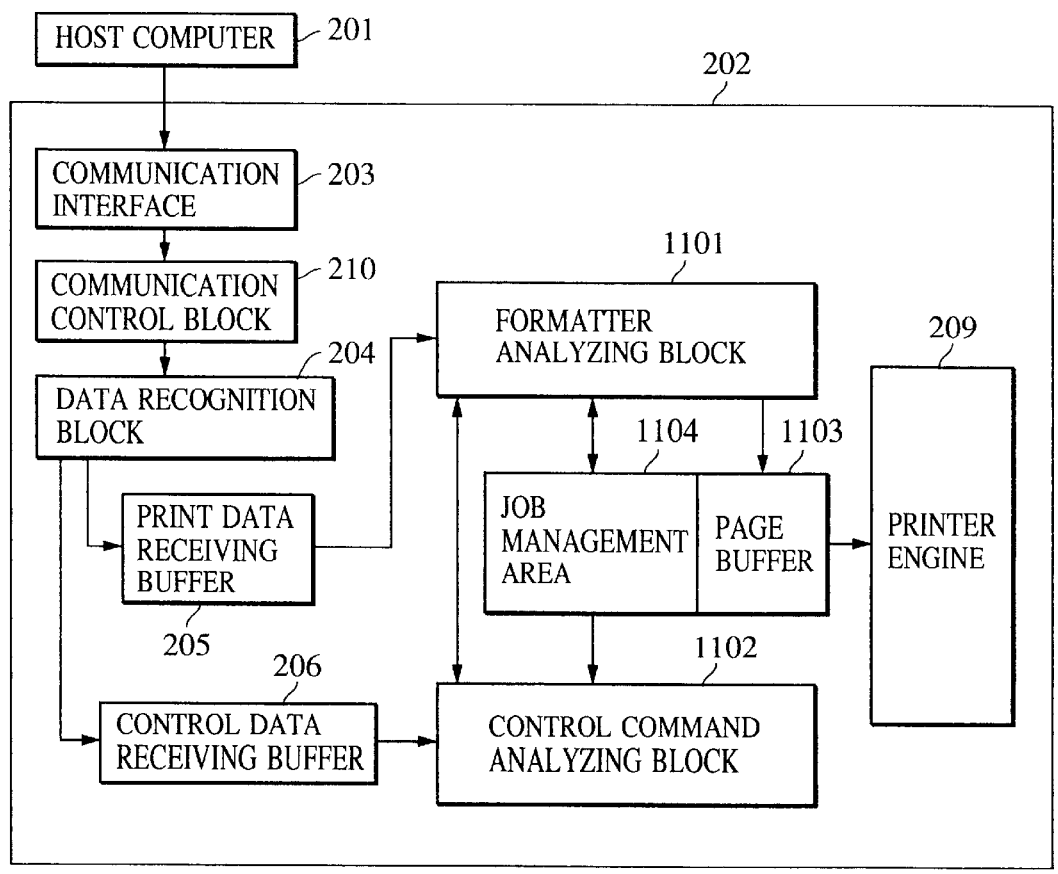
FIG. 7 is a block diagram showing a printing system which incorporates a second embodiment of the printing control device of the present invention.

FIG. 7 is a block diagram showing a printing system which incorporates a second embodiment of the printing control device of the present invention. In FIG. 7, components equivalent to those with reference to FIG. 2 are designated with the same reference numerals.

A print data receiving buffer 205 buffers the print data coming in from the communication interface 203. In this embodiment, the print data is input by a unit of data which defines one block of data of input page and which is delimited by a job start command and a job end command, and the block of data is called print job data.

A formatter analyzing block 1101 analyzes the print job data received from the host computer 201. The formatter analyzing block 1101 comprises a job management area 1104 for storing a job name and job identification contained in the job start command present in the head of the print job data and a page buffer 1103 for storing a page to be output. The output page from the page buffer 1103 forms a print image, and is sent to the printer engine 209. The formatter analyzing block 1101 includes CPU, RAM, and ROM.

The control command analyzing block 1102 analyzes the control command received from the host computer 201, and sends the control information to the formatter analyzing block 1101 according to the control command.

Figure 8:
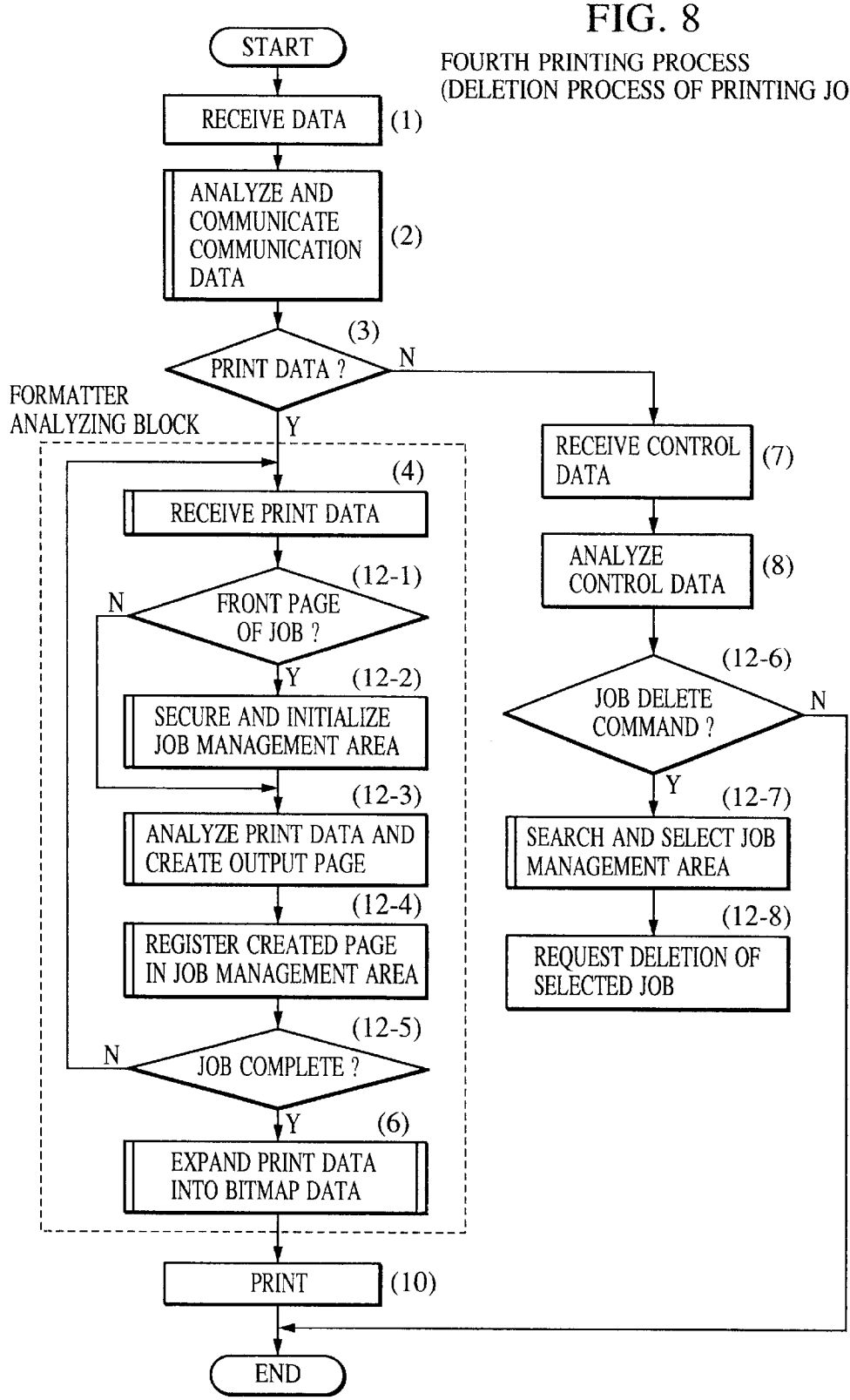
FIG. 8 is a flow diagram illustrating a fourth printing process performed by the printing control device of the present invention.

Referring now to a flow diagram shown in FIG. 8, the printing process of the printing control device of the present invention is discussed.

FIG. 8 is the flow diagram showing a fourth printing process of the printing control device of the present invention. Steps (12-1)–(12-8) are unique to this process, and steps equivalent to those in the first embodiment are designated with the same step numbers. The process corresponds to the process of the print information sent from the host computer 201 to the printer 202 (namely, the data processing shown in FIG. 7 performed by the communication interface 203, communication control block 210, data recognition block 204, formatter analyzing block 1101, and control command analyzing block 1102), and particularly to a delete process of a print job entered by control data.

The communication interface 203 receives the communication data (1), and the communication control block 210 identifies the protocol of the communication data and communicates with the host computer 201 (2). The communication control block 210 sends to the data recognition block 204 the communication data and type of protocol, and the data recognition block 204 determines according to the protocol whether the incoming data is print data or control data (3). When the data is identified as the print data, the data recognition block 204 sends the print data to the print data receiving buffer 205 (4). The formatter analyzing block 1101 analyzes the print data to detect the job start command and job end command, indicating the delimiter of each job in the analyzed data, and then stores the command in its job management area. The formatter analyzing block 1101 also stores output page in the page buffer 1103 as described below.

The formatter analyzing block 1101 reads the print job data from the print data receiving buffer 205, detects a job start command, and determines whether the print job data is a front page (12-1). In this embodiment, the determination of the front page of the job is not limited to the job start command from the host computer 201, and may be alternatively defined by an local process in the printer, for example, by a page immediately after a reset operation on the operation panel.

When the determination in step (12-1) reveals that the print job data is not a front page, the process goes to step (12-3). When the print job data is determined to be a front page, a job identification sent from the host computer 201 is written onto the job management area 1104, and the initial state at the job start of the printer (for example, information about the number of copies and sheet size at the start of job) is also stored there (12-2).

The formatter analyzing block 1101 analyzes subsequent print data, and stores created output page intermediate image information (page information) in the page buffer 1103 (12-3). After the storing of the page information onto the page buffer 1103, a pointer indicative of the output page is registered in the job management area 1104 so that the job management area 1104 may identify the corresponding output page (12-4).

The above steps are repeated to carry out the process of the job management area, the creating of the output page, and the link process between these, until the print job data is determined to be the job end command in step (12-5).

The determination of the job end command is not limited to the job end command from the host computer 201, and may be alternatively defined by a local process in the printer, for example, by a delivery operation.

When the job end is detected in step (12-5), a bit map image is created from the output page stored in the page buffer 1103 (6), and is transferred to the printer engine 209 to be printed there (10). The process is thus complete.

The flow from the job end to the expansion of the output page into the bit map for printing has been discussed. The analyzing of the print job data (steps (12-1)–(12-5)) and the printing of the print job data (steps (6), (10)) are not necessarily performed in a sequential manner. More particularly, as long as the print data is continuously received, the job management area 1104 may store a plurality of pieces of job information. The print job data is analyzed (steps (12-1)–(12-5)) while the printing (steps (6), (10)) is performed, in parallel, in the order of storage if a registered output page is present in the job management area 1104.

When the data recognition block 204 identifies the communication data as the control data in step (3), the control data is sent to the control data receiving buffer 206 (7), and the control command analyzing block 1102 analyzes the control data (8).

A determination is made of whether the control data analyzed contains a job delete command (12-6). When there is no job delete command, the process ends. When a job delete command is contained, job information is searched in the job management area 1104 according to the job identification of the job delete command, a job information area having the same identification is selected (12-7), and the formatter analyzing block 1101 is requested to delete the selected job (12-8). The formatter analyzing block 1101 deletes the job against which the delete request is made. The job delete process will be detailed later.

Figure 9:
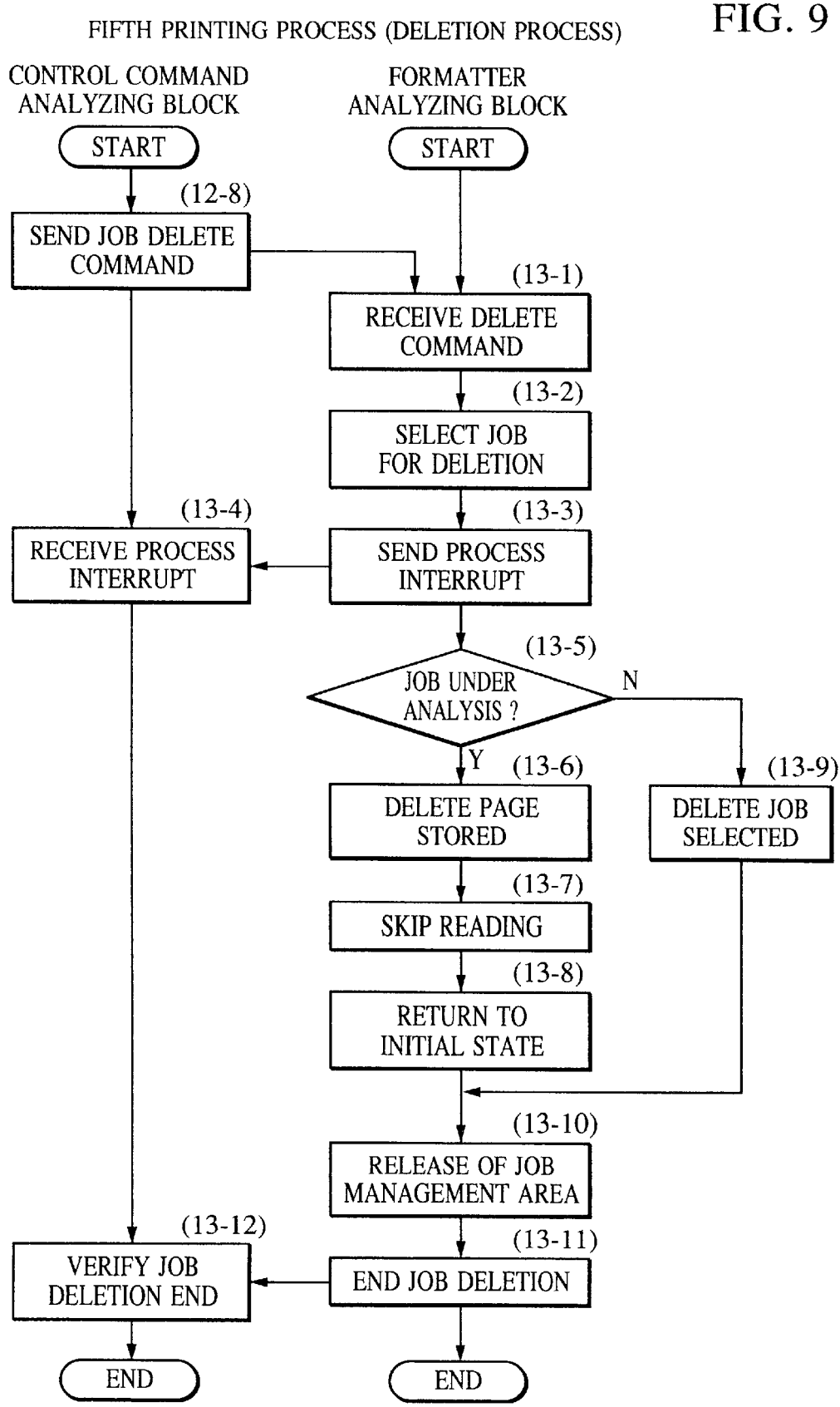
FIG. 9 is a flow diagram illustrating a fifth printing process performed by the printing control device of the present invention.

FIG. 9 is a flow diagram showing a fifth printing process of the printing control device of the present invention. The steps in the process are designated (12-8), (13-1)–(13-12), and correspond to the job delete process performed by the control command analyzing block 1102 and formatter analyzing block 1101.

Upon detecting a delete command, the control command analyzing block 1102 requests the formatter analyzing block 1101 to send a job delete command (12-8).

The control command analyzing block 1102 suspends analysis of subsequent control data and remains on standby until it receives a next report of a process interrupt from the formatter analyzing block 1101 (13-4). Any display indicating that the job delete process is in progress may be presented on the operation panel 1012. Also, the host computer 201 may be notified of the job delete process via the communication interface 203.

The control command analyzing block 1102 ends the job delete process (13-12) when it receives a report of job delete process end from the formatter analyzing block 1101, and starts analyzing the subsequent control data.

On the other hand, when the formatter analyzing block 1101 receives a job delete request from the control command analyzing block 1102 (13-1), the formatter analyzing block 1101 references the job management area 1104 and selects the job specified for deletion (13-2). The formatter analyzing block 1101 suspends its process currently in progress and sends a process interrupt to the control command analyzing block 1102 (13-3).

The formatter analyzing block 1101 determines whether the selected job is the one under analysis (13-5). When the formatter analyzing block 1101 determines that the selected job is the one under analysis, it references registration information constituting the job stored in the job management area 1104, and deletes the page stored in the page buffer 1103 (13-6).

The print job data constituting the job is subjected to skip reading process until a job end command is detected (13-7). The formatter analyzing block 1101 reads the initial information that is stored in the job management area 1104 at the job start, and returns itself to its initial setting at the job start (13-8).

If the analysis of the job specified for deletion is complete with the job stored both in the job management area 1104 and the page buffer 1103, or if the job waits for output to the printer engine 209, the formatter analyzing block 1101 references the registration information of page for the job in the job management area 1104, and deletes the page from the page buffer 1103 (13-9). The process goes to step (13-10).

After the output intermediate pages stored in the page buffer 1103 are all deleted, the formatter analyzing block 1101 initializes the job information stored in the job management area 1104, releases the area that is secured in step (12-2) as shown in FIG. 8 to store the job information in step (13-10), and reports the end of the job deletion to the control command analyzing block 1102 (13-11), completing the process.

Although the formatter analyzing block 1101 reverts to its job start setting stored when it completes the job delete process in this embodiment, control may be optionally devised not to revert to the job start setting. In such a case, what is deleted is only the page stored in the page buffer 1103.

Referring to FIG. 7, the correspondence between this embodiment and each means specified in the seventh to tenth aspects of the present invention, and the advantages of the embodiment are discussed.

According to the seventh and eighth aspects of the present invention, the printing control device comprises communication control means (communication control block 210) which performs a plurality of data communications with an information processing apparatus (host computer 201) via a predetermined communication medium (interface and network) by using at least two protocols in accordance with a predetermined hierarchical level; sorting means (data recognition block 204) for sorting, into print data and control data, communication data that is received on a protocol by protocol basis of the protocols the communication control means uses in communication with the information processing apparatus; first analyzing means (formatter analyzing block 1101) for analyzing, on a per job basis, the print data sorted by the sorting means to create job management information used to determine the area of each job and output page data for each job; memory means (job management area 1104, page buffer 1103) for linking and storing the job management information and the output page data based on the job management information; and second analyzing means (control command analyzing block 1102) for analyzing the control data sorted by the sorting means to check required job information against the job management information stored in the memory means and to select a job to be processed. The communication control block 210 performs a plurality of communications with the host computer 201 via the predetermined communication medium using at least two different protocols at a predetermined hierarchical level. The data recognition block 204 identifies the type of protocol used in communication with the host computer 201. The data recognition block 204 sorts, into the control data and the print data, the communication data that is received according to the type of protocol. The formatter analyzing block 1101 analyzes the sorted print data by the unit of job and creates job management information for determining the area of each job and the output page data for each job. The job management information and the output page data based on the job management information are linked and stored in the job management area 1104 and page buffer 1103, along with the initial state of the printer apparatus at the job start of the job management information. The control command analyzing block 1102 analyzes the control data sorted by the sorting means to check required job information against the job management information stored in the job management area 1104 and to select a job to be processed. A series of the output page data which the formatter analyzing block 1101 retrieves by referencing the job management information of the job to be processed are processed according to control data, based on the job to be processed selected by control command analyzing block 1102. The print job data already received is thus selected and processed by the subsequent control command.

According to the ninth and tenth aspects of the present invention, after a series of the output page data which the formatter analyzing block 1101 retrieves by referencing the job management information of the job to be processed are processed according to control data, for example a delete command, based on the job to be processed selected by the control command analyzing block 1102, the state of the printing apparatus is recovered to the initial state of the printing apparatus at the job start of each piece of job management information stored in the job management area 1104. After the process, the printing apparatus is returned to the state prior to the start of the printing job.

Referring to FIG. 8, the correspondence between this embodiment and each step specified in the seventeenth and eighteenth aspects of the present invention, and the advantages of the embodiment are discussed.

According to the seventeenth aspect of the present invention, the printing control method which controls printing process based on communication data received from an information processing apparatus (host computer 201) via a predetermined communication medium (interface and network), comprises the step of sorting (steps (1)–(4) and (7) in FIG. 8), into different types of data, communication data that is received on a protocol by protocol basis, wherein the communication data is received using at least two protocols in accordance with a predetermined hierarchical level; the step of registering (steps (12-1)–(12-4) in FIG. 8) in which sorted print data is analyzed on a per job basis to link and store, in a memory, job management information for determining the area of each job and output page data for each job; the step of selecting a job to be processed (step (12-7) in FIG. 8) by analyzing control data sorted by the sorting means to check required job information against the job management information stored in the memory and to select a job to be processed; and the step of data processing (step (12-8) in FIG. 8 and steps (13-1)–(13-12) in FIG. 9) in which a series of the output page data which are retrieved by referencing the job management information of the job to be processed are processed according to control data, based on the selected job to be processed. The control program including these steps, stored in an unshown memory resource, are executed by unshown CPU in the printer 202. The print job data already received is thus selected and processed by the subsequent control command.

According to the eighteenth aspect of the present invention, the storage medium, which stores a program that is read by a computer that controls printing process based on communication data received from an information processing apparatus via a predetermined communication medium, stores a program comprising the step of sorting (steps (1)–(4) and (7) in FIG. 8), into different types of data, communication data that is received on a protocol by protocol basis, wherein the communication data is received using at least two protocols in accordance with a predetermined hierarchical level; the step of registering (steps (12-1)–(12-4) in FIG. 8) in which sorted print data is analyzed on a per job basis to link and store, in a memory, job management information for determining the area of each job and output page data for each job; the step of selecting a job to be processed (step (12-7) in FIG. 8) by analyzing control data sorted by the sorting means to check required job information against the job management information stored in the memory and to select a job to be processed; and the step of data processing (step (12-8) in FIG. 8 and steps (13-1)–(13-12) in FIG. 9) in which a series of the output page data which are retrieved by referencing the job management information of the job to be processed are processed according to control data based on the selected job to be processed. A program code corresponding to the steps in FIG. 8 is stored in an unshown memory resource in the printer 202, and CPU in the printer 202 reads the program code stored in the memory resource and executes the program. This arrangement falls within the scope of the present invention.

Third Embodiment

Figure 10:
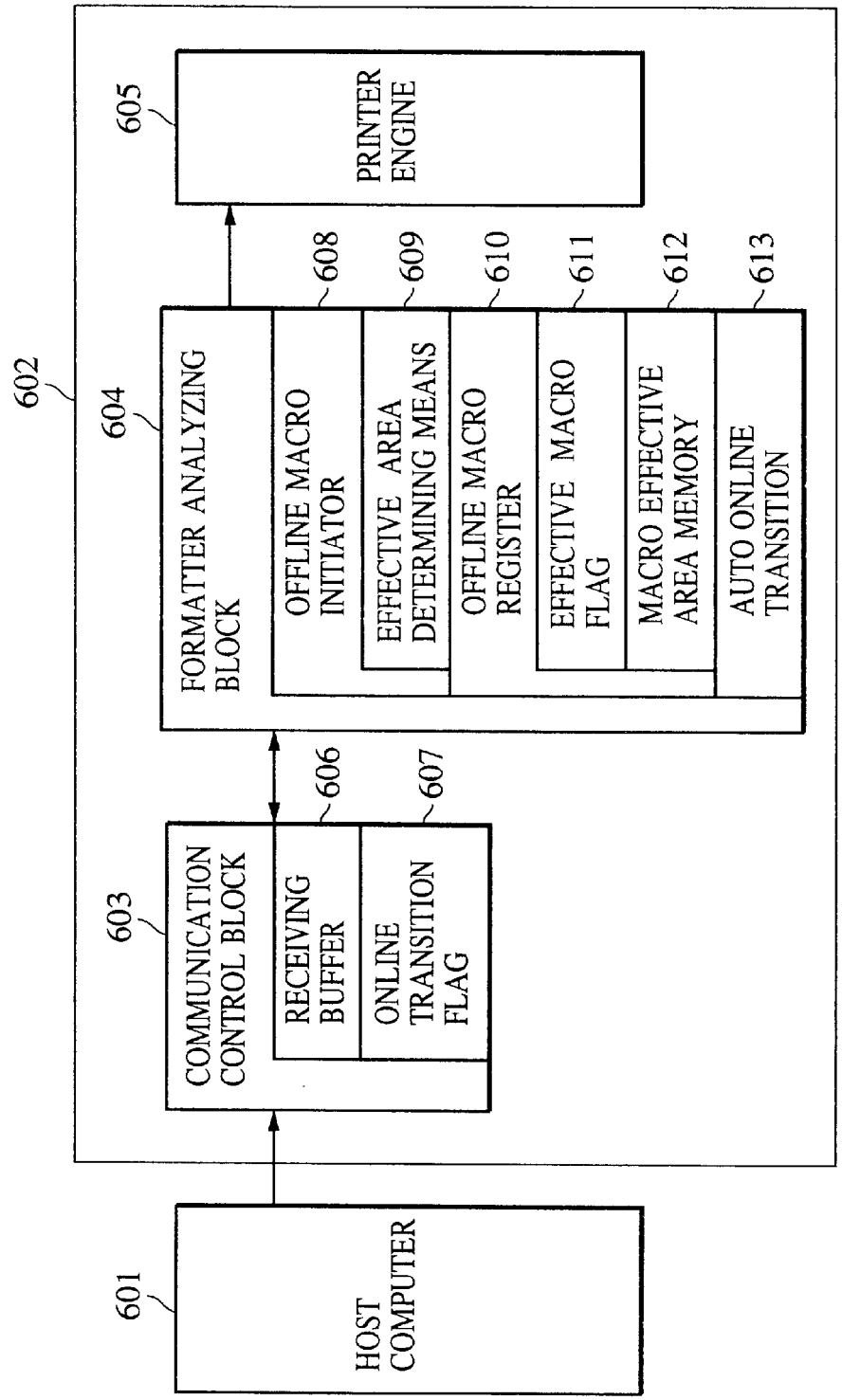
FIG. 10 is a block diagram showing a printing system which incorporates a third embodiment of the printing control device of the present invention.

FIG. 10 is a block diagram showing a printing system which incorporates a third embodiment of the printing control device of the present invention.

As shown, a host computer 601 outputs print information including print data and control data to a printing apparatus 602.

The printing apparatus 602 is chiefly constructed of a communication control block 603, a formatter analyzing block 604, and a printer engine 605.

The communication control block 603 includes a receiving buffer 606 for controlling the reception of the data sent from the host computer 601 and the transmission of the received data to the formatter analyzing block 604, and an online transition flag 607 functioning as state hold means in this embodiment. The receiving buffer 606 stores the print data coming in from the host computer 601. The online transition flag 607 records that a transition to offline is made in response to the control command from the host computer 601. When the transition to the offline state is made in response to the control command from the host computer 601, the internal flag is turned on and an on flag is retained. The flag is turned off when an online state is recovered.

The formatter analyzing block 604 analyzes the print information received from the host computer 601, and expands it into bit map data and sends the bit map data to the printer engine 605. The formatter analyzing block 604 includes CPU, RAM, ROM, and the like, and further includes an offline macro initiator 608 functioning offline macro means and provided with effective area determining means 609, an offline macro register 610 provided with both an effective macro flag 611 and an macro effective area memory 612, and automatic online transition section 613.

When an offline command is received from the host computer 601 and when there is an effective offline macro in the offline macro register 610, the offline macro initiator 608 executes that macro. The offline macro is the one that is carried out during the offline state of the printer, and for example, a control process including values in a nonvolatile RAM, an operation of the operation panel of the printer, and a reset process may be constructed into a macro instruction. Although a control process that has to be carried out during print interrupt is preferably constructed into a macro, other processes may be included as well.

After execution of the macro, the effective area determining means 609 determines whether the macro effective area from the macro effective area memory 612 is ineffective next time. If it is ineffective, the effective area determining means 609 turns off the effective macro flag 611.

In this embodiment, after executing the macro, the effective area determining means 609 functioning as the effective area determining means obtains the macro effective area from the macro effective area memory 612 to determine whether the macro is effective or not next time. Although the determination is performed after the execution of macro in this embodiment, it is acceptable that the determination is made prior to the macro execution. The effective area determining means 609 is included in the offline macro initiator 608. The effective area of a macro indicates the area of printing process in which that macro is effective, and in this embodiment, a macro to be executed represents an effective job. For example, if a macro is set to have an effect on the identifier of one particular job only, the effective area of the macro is defined by jobs having that identifier. The unit of effective area may arbitrarily be set in another embodiment.

The offline macro register 610 functioning the offline macro means stores the macro during offline in this embodiment. The effective macro flag 611 functioning as effective macro flag means in this embodiment stores an indication of whether the macro that is initiated during offline is effective. If the macro is ineffective, the internal flag is turned off. When a macro is registered, the internal flag is turned on.

The macro effective area memory 612 functioning as macro effective area memory means stores the area in which a registered offline macro is effective in this embodiment. Furthermore in this embodiment, after the execution of an offline macro, the automatic online transition section 613 functioning as the automatic online transition means in this embodiment requests the communication control block 603 to perform online transition when the online transition flag 607 is on. The transition to the online state is thus carried out.

Figure 11:
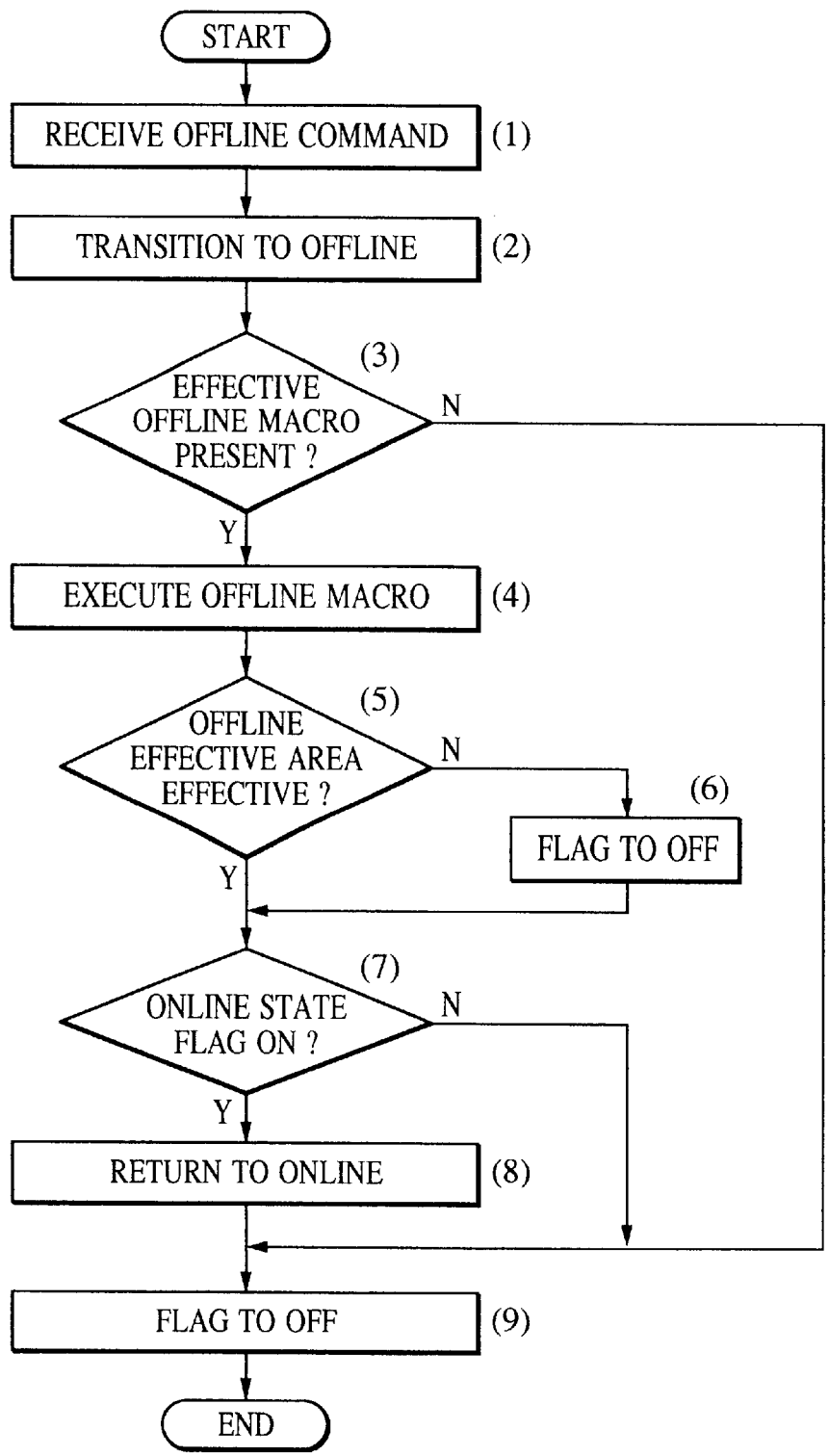
FIG. 11 is a flow diagram illustrating a sixth printing process performed by the printing control device of the present invention.

Referring to a flow diagram shown in FIG. 11, the printing process of the printing control device of the present invention is now discussed.

FIG. 11 is the flow diagram showing a sixth printing process of the printing control device of the present invention. The steps in the process are designated (1)–(9), and correspond to the control process of the printing apparatus 602 when it receives an offline command from the host computer 601.

When the printing apparatus 602 receives an offline command from the host computer 601 (1), the communication control block 603 transitions the communication status with the host computer 601 to the offline state (turns on the online transition flag 607) (2).

The formatter analyzing block 604 determines whether an effective offline macro is present in the offline macro register 610 (3). When there is no effective offline macro there, the process goes to step (9). When there is an effective macro there, the offline macro initiator 608 executes the offline macro (4). After the execution of the macro, the effective area determining means 609 obtains the macro effective area from the macro effective area memory 612 and determines whether the offline effective area is effective (5). When the offline effective area is determined to be ineffective, the effective macro flag 611 is turned off (6), and the process goes to step (7).

When the offline macro area is determined to be effective in step (5), a determination is made of whether the online transition flag 607 is on (7). When the flag is not on, the process goes to step (9). When the flag is on, the automatic online transition section 613 of the formatter analyzing block 604 requests the communication control block 603 to transition to the online state. The online state is thus recovered (8). The online transition flag 607 is turned off (9), completing the process.

Referring to FIG. 10, the correspondence between this embodiment and each means specified in the eleventh through thirteenth aspects of the present invention, and the advantages of the embodiment are discussed.

According to the eleventh aspect of the present invention, the printing control device communicating with an information processing apparatus (host computer 601) via a predetermined communication medium (interface and network), comprises macro memory means (offline macro register 610) for storing a plurality of macros to be executed, when a communication status with a information processing apparatus is transitioned to an offline state in response to a control command received from the information processing apparatus; and offline macro means (offline macro initiator 608) for executing one of the macros stored in the macro memory means specified, when the communication status is transitioned to the offline state. When the communication status with the information processing apparatus is transitioned to the offline state in response to the control command received from the information processing apparatus, the offline macro means executes one of the macros stored in the macro memory means specified. A desired macro is thus processed after transition to the offline state in response to the offline command from the host computer.

According to the eleventh and twelfth aspects of the present invention, the printing control device comprises state hold means (a memory resource in the communication control block 603) for holding an online transition flag (online transition flag 607) for transitioning to an online state, after the communication status with the host computer 601 is transitioned to the offline state subsequent to the execution of the macro by the offline macro initiator 608 based on the control command from the information processing apparatus; and automatic online transition means (automatic online transition section 613) for returning the communication status with the information processing apparatus to the online state based on the state of the online transition flag 607 stored in the state hold means. The online transition flag 607 for transitioning to the online state is held in the communication control block 603 after the communication status with the host computer 601 is transitioned to the offline state, subsequent to the execution of the macro by the offline macro initiator 608 based on the control command from the host computer 601. In accordance with the state of the online transition flag held, the automatic online transition section 613 returns the communication status with the host computer 601 to the online state. Even during the offline state in which the communication with the host computer is disabled, the control data from the host computer recovers the online state in which the communication with the host computer is enabled.

According to the eleventh and thirteenth aspects of the present invention, the printing control device comprises macro effective area memory means (macro effective area memory 612) for storing an effective area within which the macro is re-executed; effective area determining means (effective area determining means 609) for determining whether the area corresponding to the macro executed by the offline macro means is the effective area; and effective macro flag memory means (effective macro flag 611) for storing an effective flag indicating that the macro which the offline macro means executes based on the determination result of the effective area determining means is an effective macro to be re-executed. The effective area determining means 609 determines whether the area corresponding to the macro executed by the offline macro initiator 608 is the effective area stored in the macro effective area memory 612. In accordance with the determination result of the effective area determining means 609, the effective macro flag 611 stores an effective flag indicating that the macro executed by the offline macro initiator 608 is an effective macro to be re-executed. The offline macro initiator 608 restricts the re-execution of the macro based on the effective flag stored in the effective macro flag 611. The number of execution of macros already executed at the transition to the offline state is thus restricted.

Referring to FIG. 11, the correspondence between this embodiment and each step specified in the nineteenth and twentieth aspects of the present invention, and the advantages of the embodiment are discussed.

According to the nineteenth aspect of the present invention, the printing control method, which controls printing process based on communication data received from an information processing apparatus (host computer 601) via a predetermined communication medium (interface and network), comprises the step of transitioning (steps (1) and (2) in FIG. 11) to an offline state the communication status with the information processing apparatus in response to a control command received from the information processing apparatus; the step of macro executing (step (4) in FIG. 11) in which an effective macro is retrieved and executed after transitioniong to the offline state; the step of state holding (step (2) in FIG. 11) an online transition flag 607 for transitioning to an online state after the communication status with the information processing apparatus is transitioned to the offline state; and the step of transitioning (step (8) in FIG. 11) the communication status with the information processing apparatus to the online state based on the state of the online transition flag 607 stored. The control program, including these steps, stored in an unshown memory resource, are executed by unshown CPU in the printer 602. Even when the communication with the host computer is disabled after the execution of the effective macro subsequent to the transition to the offline state, the control data from the host computer recovers the online state in which the communication with the host computer is enabled.

According to the twentieth aspect of the present invention, the storage medium which stores a program that is read by a computer that controls printing process based on communication data received from an information processing apparatus (host computer 601) via a predetermined communication medium, stores a program comprising the step of transitioning (steps (1) and (2) in FIG. 11) to an offline state the communication status with the information processing apparatus in response to a control command received from the information processing apparatus; the step of macro executing (step (4) in FIG. 11) in which an effective macro is retrieved and executed after transitioniong to the offline state; the step of state holding (step (2) in FIG. 11) an online transition flag 607 for transitioning to an online state after the communication status with the information processing apparatus is transitioned to the offline state; and the step of transitioning (step (8) in FIG. 11) the communication status with the information processing apparatus to the online state based on the state of the online transition flag 607 stored. A program code corresponding to the steps in FIG. 11 is stored in an unshown memory resource in the printer 602, and CPU in the printer 602 reads the program code stored in the memory resource and executes the program. This arrangement falls within the scope of the present invention.

Fourth Embodiment

Figure 12:
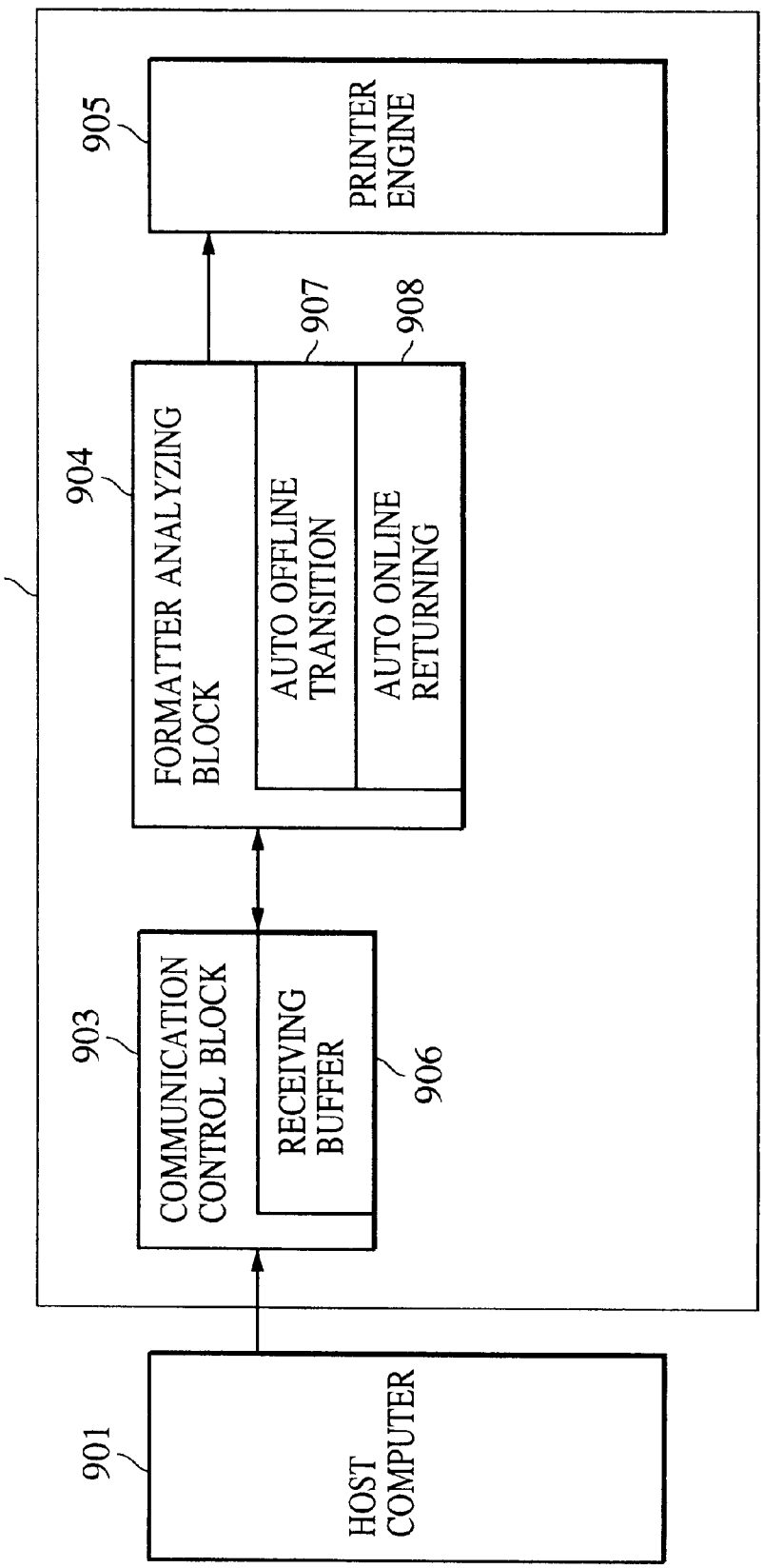
FIG. 12 is a block diagram showing a printing system which incorporates a fourth embodiment of the printing control device of the present invention.

FIG. 12 is a block diagram showing a printing system which incorporates a fourth embodiment of the printing control device of the present invention.

As shown, a host computer 901 outputs print information including print data and control data to a printing apparatus 902.

The printing apparatus 902 is chiefly constructed of a communication control block 903, a formatter analyzing block 904, and a printer engine 905. The communication control block 903 receives data transmitted by the host computer 901, and sends it to the formatter analyzing block 904. The communication control block 903 is provided with a receiving buffer 906.

The formatter analyzing block 904 analyzes the print information received from the host computer 901, expands it into bit map data and sends the bit map data to the printer engine 905. When control data is contained in the print information, the formatter analyzing block 904 analyzes the data after passing it through an automatic offline transition section 907. The formatter analyzing block 904 analyzes the control command and executes it and reports the end of the execution to the automatic online returning section 908.

The formatter analyzing block 904 includes CPU, RAM, ROM and the like.

In this embodiment, the automatic offline transition section 907 functioning as the automatic offline transition means requests the communication control block 903 to transition to the offline state if the control command analyzed by the formatter analyzing block 904 needs the offline state. The automatic online returning section 908 functioning as automatic online returning means requests the communication control block 903 to return to the online if the offline is entered by the control command analyzed and then executed by the formatter analyzing block 904.

Referring now to a flow diagram shown in FIG. 13, the printing process of the printing control device of the present invention is discussed.

FIG. 13 is the flow diagram showing a seventh printing process of the printing control device of the present invention. The steps in the process are designated (1)–(7), and correspond to the control process of the printing apparatus 902 when it receives an offline command from the host computer 901.

When the communication control block 903 receives control data from the host computer 901 (1), the communication control block 903 relays the control data to the formatter analyzing block 904. The formatter analyzing block 904 analyzes the control data (2). The formatter analyzing block 904 notifies the automatic offline transition section 907 of each control command before executing it.

The automatic offline transition section 907 determines whether there is a control command to be executed after transitioning to the offline state (3). When the determination reveals that there is a control command to be executed after the transition to the offline state, the communication control block 903 is requested to transition to the offline state (4). After transitioning to the offline state, the formatter analyzing block 904 executes the control command (5). After the formatter analyzing block 904 executes the control command, it reports the execution of the control command to the automatic online returning section 908. In response to the report, the automatic online returning section 908 issues an online transition command to the communication control block 903 to return to the online state. The online is recovered (6), and the process ends.

When the determination reveals that there is no control command to be executed after the transition to the offline in step (3), the formatter analyzing block 904 executes the control command (7), completing the process.

Referring to FIG. 12, the correspondence between this embodiment and each means specified in the fourteenth aspect of the present invention, and the advantages of the embodiment are discussed.

According to the fourteenth aspect of the present invention, the printing control device, which communicates with an information processing apparatus (host computer 901) via a predetermined communication medium (interface and network), comprises analyzing means (formatter analyzing block 904) for analyzing the type of a control command received from the information processing apparatus to determine whether the control command is a command to be executed after transitioning to an offline state; offline transition means (automatic offline transition section 907) for executing the command to be executed after transitioning to the offline state, after the communication status with the information processing apparatus is transitioned to the offline state based on the determination result of the analyzing means; and return-to-online means (automatic online returning section 908) for returning the communication status with the information processing apparatus to an online state after the offline transition means executes the command to be executed after transitioning to the offline state. The formatter analyzing block 904 analyzes the type of the control command received from the host computer 901 to determine whether the control command is the one to be executed after the transition to the offline state. Based on the determination, the communication with the host computer 901 is transitioned to the offline state. The automatic offline transition section 907 executes the command to be executed after the transition to the offline state. After the execution of the command, the automatic online returning section 908 returns the communication status with the host computer 901 to the online state. The process to be executed during the offline state is thus freely carried out by the command from the host computer. The communication status with the host computer is reliably returned to the online state.

Referring to FIG. 13, the correspondence between this embodiment and each step specified in the twentieth-first and twentieth-second aspects of the present invention, and the advantages of the embodiment are discussed.

According to the twenty-first aspect of the present invention, the printing control method, which controls printing process based on communication data received from an information processing apparatus (host computer 901) via a predetermined communication medium (interface and network), comprises the step of analyzing (steps (1)–(3) in FIG. 13) the type of a control command received from the information processing apparatus to determine whether the control command is a command to be executed after transitioning to an offline state; the step of transitioning (step (4) in FIG. 13) in which the command to be executed after transitioning to the offline state is executed after the communication status with the information processing apparatus is transitioned to the offline state based on the determination result of the analyzing means; and the step of return to online (steps (5) and (6) in FIG. 13) in which the communication status with the information processing apparatus is transitioned to an online state after the command to be executed after transitioning to the offline state is executed. Since the control program, including these steps, stored in an unshown memory resource such as ROM, are executed by unshown CPU in the printer 902, the process to be executed during the offline state is thus freely carried out by the command from the host computer, and the online state in which communication with the host computer is enabled is reliably recovered.

According to the twenty-second aspect of the present invention, the storage medium, which stores a program that is read by a computer that controls printing process based on communication data received from an information processing apparatus via a predetermined communication medium, stores a program comprising the step of analyzing (steps (1)–(3) in FIG. 13) the type of a control command received from the information processing apparatus to determine whether the control command is a command to be executed after transitioning to an offline state; the step of transitioning (step (4) in FIG. 13) in which the command to be executed after transitioning to the offline state is executed after the communication status with the information processing apparatus is transitioned to the offline state based on the determination result of the analyzing means; and the step of return to online (steps (5) and (6) in FIG. 13) in which the communication status with the information processing apparatus is transitioned to an online state after the command to be executed after transitioning to the offline state is executed. A program code corresponding to the steps in FIG. 13 is stored in an unshown memory resource in the printer 902, and CPU in the printer 902 reads the program code stored in the memory resource and executes the program. This arrangement falls within the scope of the present invention.

Referring to a memory map shown in FIG. 14, the construction of the data processing program readable by the printing system of the present invention is now discussed.

FIG. 14 describes the memory map of the storage medium that stores various data processing programs readable by the printing control device of the present invention.

Although it is not shown, information managing a group of programs, such as version information and the name of a programmer, is also stored in a storage medium. Furthermore, information dependent on the operating system (OS) of a reader side, such as an icon identifying a program, may also be stored.

Data subordinate to each program may be managed in the directories. When a program for installing each program and a program to be installed are compressed, a decompression program may be stored.

The functions of the embodiments shown in FIGS. 4–6, 8, 9, 11, and 13 may be performed by the host computer under the control of a installed program. The apparatus is supplied with a group of information including programs by a storage medium such as CD-ROM, flash memory, floppy disk and an external storage medium via a network. Such an arrangement also falls within the scope of the present invention.

The storage medium holding a program code of software for carrying out the functions of the embodiments is loaded in the printing system or apparatus. The computer (CPU or MPU) of the system or apparatus reads the program code stored in the storage medium to execute the program. The objects of the present invention are thus achieved.

The program code read from the storage medium performs the novel functions of the present invention, and the storage medium storing the program code constitutes the present invention.

Available as storage media for feeding the program code are floppy disk, hard disk, optical disk, magneto-optic disk, CD-ROM, CD-R, magnetic tape, non-volatile memory card, ROM, EEPROM and the like.

By executing the program code read by the computer, the functions of the embodiments are performed. Furthermore, the OR running on the computer performs partly or entirely an actual process according to the instruction of the program code, and the functions of the embodiments are thus performed.

The program code read from the storage medium is written on an function expansion board inserted into the computer or a memory provided on an function expansion unit. CPU on the expansion board or unit partly or entirely performs the process. The functions of the embodiments are thus performed.

As described above, according to the first through sixth aspects of the present invention, the communication control means performs a plurality of data communications with an information processing apparatus via a predetermined communication medium by using at least two protocols in accordance with a predetermined hierarchical level, for example, at a transport layer or higher. The sorting means recognizes the type of protocol the communication control means uses in communication with the information processing apparatus, and sorts, into control data and print data, communication data recognized according to the type of data. The data processing means performs a predetermined data processing to the print data to convert it into bit map data and performs a predetermined control command. Both the print data and control data of the communication are thus processed in parallel or in an interruptible manner.

According to the seventh and eighth aspects of the present invention, the communication control means performs a plurality of data communications with an information processing apparatus via a predetermined communication medium by using at least two protocols in accordance with a predetermined hierarchical level. The sorting means recognizes the type of protocol the communication control means uses in communication with the information processing apparatus, and sorts, into control data and print data, communication data recognized according to the type of data. The first analyzing means analyzes, on a per job basis, the print data sorted by the sorting means to create job management information used to determine the area of each job and output page data for each job. The second analyzing means analyzes the control data sorted by the sorting means to check required job information against the job management information stored in the memory means and to select a job to be processed. A series of the output page data which the first analyzing means retrieves by referencing the job management information of the job to be processed are processed according to control data, based on the job to be processed selected by the second analyzing means. The print job data already received is thus selected and processed by the subsequent control command.

According to the ninth and tenth aspects of the present invention, after a series of the output page data which the first analyzing means retrieves by referencing the job management information of the job to be processed are processed according to control data, based on the job to be processed selected by the second analyzing means, for example, after a print job is deleted according to a delete command, the state of the printing apparatus is recovered to the initial state of the printing apparatus at the job start of each piece of job management information stored in the memory means. After the process, the printing apparatus is returned to the state prior to the start of the printing job.

According to the eleventh aspect of the present invention, the offline macro means executes one of the macros stored in the macro memory means specified in transition to the offline state when a communication status with a information processing apparatus is transitioned to an offline state in response to a control command received from the information processing apparatus. A desired macro is processed after the transition to the offline state in response to the offline command from the information processing apparatus.

According to the twelfth aspect of the present invention, the state hold means holds an online transition flag for transitioning to an online state, after the communication status with the information processing apparatus is transitioned to the offline state subsequent to the execution of the macro by the macro means based on the control command from the information processing apparatus. The automatic online transition means returns the communication status with the information processing apparatus to the online state based on the state of the online transition flag stored in the state hold means. Even during the offline state in which the communication with the host computer is disabled, the control data from the host computer recovers the online state in which the communication with the host computer is enabled.

According to the thirteenth aspect of the present invention, the effective area determining means determines whether the area corresponding to the macro executed by the offline macro means is the effective area stored in the macro effective area memory means. The effective macro flag memory means stores an effective flag indicating that the macro which the offline macro means executes based on the determination result of the effective area determining means is an effective macro to be re-executed. The offline macro means restricts the re-execution of the macro based on the effective flag stored in the effective macro flag memory means. The number of execution of macros already executed at the transition to the offline state is thus restricted.

According to the fourteenth aspect of the present invention, the analyzing means analyzes the type of a control command received from the information processing apparatus to determine whether the control command is a command to be executed after transitioning to an offline state. The offline transition means executes the command to be executed after transitioning to the offline state, after the communication status with the information processing apparatus is transitioned to the offline state based on the determination result of the analyzing means. The return-to-online means returns the communication status with the information processing apparatus to an online state after the offline transition means executes the command to be executed after transitioning to the offline state. The process to be executed during the offline state is thus freely carried out by the command from the host computer, and the online state in which communication with the host computer is enabled is reliably recovered.

According to the fifteenth and sixteenth aspects of the present invention, the protocol type of the communication data that is received using at least two protocols in accordance with a predetermined hierarchical level is identified. The communication data is then sorted according to the type of data into different type data, which is subjected to different data processinges. The print data and control data of the communication data are thus processed in parallel or in an interruptible manner.

According to the seventeenth and eighteenth aspects of the present invention, the protocol type of the communication data that is received using at least two protocols in accordance with a predetermined hierarchical level is identified. The communication data is then sorted according to the type of data into different type data, which is subjected to different data processinges. The print data sorted is analyzed on a per job basis. The job management information used to determine the area of each job and the output page data for each job are linked and registered in the memory. The control data sorted is analyzed to check required job information against the job management information registered in the memory and to select a job to be processed. A series of the output page data which is retrieved by referencing the job management information of the job to be processed are processed according to control data, based on the job to be processed selected by the second analyzing means. The print job data already received is thus selected and processed by the subsequent control command.

According to the nineteenth and twentieth aspects of the present invention, the communication status with the information processing apparatus is transitioned to the offline state in response to a control command received from the information processing apparatus. An effective macro is retrieved and executed after transitioniong to the offline state. An online transition flag for transitioning to an online state is held after the communication status with the information processing apparatus is transitioned to the offline state. When an effective offline macro is executed, the communication status with the information processing apparatus is transitioned to the online state based on the state of the online transition flag stored. When the communication with the host computer is disabled after the transition to the offline state and execution of the effective macro, the control data from the host computer recovers the online state in which the communication with the host computer is enabled.

According to the twenty-first and twenty-second aspects of the present invention, the printing control method, the type of a control command received from the information processing apparatus is analyzed to determine whether the control command is a command to be executed after transitioning to an offline state. The command to be executed after transitioning to the offline state is executed after the communication status with the information processing apparatus is transitioned to the offline state based on the determination result. The communication status with the information processing apparatus is transitioned to an online state after the command to be executed after transitioning to the offline state is executed. The process to be executed during the offline state is thus freely carried out by the command from the host computer, and the online state in which communication with the host computer is enabled is reliably recovered.

What is claimed is:

1. A printing control apparatus comprising:
   receiving means for receiving data from an external apparatus via a communication medium by using one of at least two types of packets;
   determining means for determining whether the received data is print data or control data according to the used type of packet;
   first processing means for processing the print data if the received data is print data; and
   second processing means for analyzing the control data and determining whether or not the control data contains a delete command if the received data is control data,
   wherein said receiving means receives print data using one type of the at least two types of packets and is able to receive control data containing the delete command using a different type of the at least two types of packets, and wherein said second processing means deletes a desired print job in response to the delete command.

2. An apparatus according to claim 1, wherein said first processing means analyzes the print data and generates image data, and wherein a printing module prints images based on the image data.

3. An apparatus according to claim 1, wherein the type of packet is a packet according to a protocol wherein a level of the protocol is a transport layer or higher.

4. An apparatus according to claim 1, wherein said receiving means receives the print data and the control data in parallel or in an interruptible manner by using each of the at least two types of packets.

5. An apparatus according to claim 1, further comprising:
identification storage means for linking identification to the print job and storing the identification,
wherein said second processing means controls said first processing means to delete the print data of the print job corresponding to identification included in the control data.

6. An apparatus according to claim 5, further comprising:
data storage means for storing page print data based on the print data,
wherein said first processing means analyzes the print data and generates the page print data.

7. An apparatus according to claim 6, wherein said second processing means controls said data storage means to delete the page print data based on the print data of the print job corresponding to the identification included in the control data.

8. An apparatus according to claim 1, wherein the at least two types of packets are different between protocols.

9. A printing control method for controlling a printing process, said method comprising:
a receiving step for receiving data from an external apparatus via a communication medium by using one of at least two types of packets;
a determining step for determining whether the received data is print data or control data according to the used type of packet;
a first processing step for processing the print data if the received data is print data; and
a second processing step for analyzing the control data and determining whether or not the control data contains a delete command if the received data is control data,
wherein, in said receiving step, print data is received using one type of the at least two types of packets and control data containing the delete command is capable of being received using a different type of the at least two types of packets, and wherein in response to the delete command a desired print job is deleted in said second processing step.

10. A method according to claim 9, wherein said first processing step analyzes the print data and generates image data wherein a printing module prints images based on the image data.

11. A method according to claim 9, wherein the type of packet is a packet according to a protocol wherein a level of the protocol is a transport layer or higher.

12. A method according to claim 9, wherein said receiving step receives the print data and the control data in parallel or in an interruptible manner by using each of the at least two types of packets.

13. A method according to claim 9, further comprising:
an identification storing step for linking identification to the print job and storing identification in identification storage means;
wherein said second processing step controls said first processing step to delete the print data of the print job corresponding to identification included in the control data.

14. A method according to claim 13, further comprising:
data storing step for storing page print data based on the print data in data storage means,
wherein said first processing step analyzes the print data and generates the page print data.

15. A method according to claim 14, wherein said second processing step control said data storage means to delete the page print data based on the print data of the print job corresponding to the identification included in the control data.

16. A method according to claim 9, wherein the at least two types of packets are different between protocols.

17. A storage medium for storing a program that is read by a computer which controls printing process, said program comprising:
a receiving step for receiving data from an external apparatus via one of at least two types of packets;
a determining step for determining whether the received data is print data or control data according to the used type of packet;
a first processing step for processing the print data if the received data is print data; and
a second processing step for analyzing the control data and determining whether or not the control data contains a delete command if the received data is control data,
wherein, in said receiving step, print data is received using one type of the at least two types of packets and control data containing the delete command is capable of being received using a different type of the at least two types of packets, and wherein in response to the delete command a desired print job is deleted in said second processing step.

18. A program for controlling printing process, said program controlling a computer to perform the steps of:
receiving data from an external apparatus via a communication medium by using one of at least two types of packets;
determining whether the received data is print data or control data according to the used type of packet;
processing the print data if the received data is print data; and
analyzing the control data and determining whether or not the control data contains a delete command if the received data is control data,
wherein print data is received using one type of the at least two types of packets and control data containing the delete command is capable of being received using a different type of the at least two types of packets, and wherein in response to the delete command a desired print job is deleted.

19. A printing control apparatus comprising:
receiving means for receiving data from an external apparatus via a communication medium by using one of at least two type of packets;
determining means for determining whether the received data is print data or control data according to the used type of packet;
first processing means for processing the print data if the received data is print data; and
second processing means for analyzing the control data and determining whether or not the control data contains an interrupt command if the received data is control data,
wherein said receiving means receives print data using one type of the at least two types of packets and is able to receive control data containing the interrupt command using a different type of the at least two types of packets, and wherein said second processing means is able to interrupt reception or processing of print data in response to the interrupt command.

20. An apparatus according to claim 19, wherein said receiving means receives the print data and the control data in parallel or in an interruptible manner by using each of the at least two types of packets.

21. An apparatus according to claim 19, wherein, if the received data is control data, said second processing means analyzes the control data and determines whether or not the control data contains a command to return to an online state.

22. An apparatus according to claim 21, wherein said second processing means returns a communication process to the online state in response to the command to return to the online state.

23. An apparatus according to claim 19, wherein said second processing means interrupts analysis of the print data in response to the interrupt command.

24. An apparatus according to claim 19, wherein the at least two types of packets are different between protocols.

25. A printing control method for controlling a printing process, said method comprising:

a receiving step for receiving data from an external apparatus via a communication medium by using one of at least two types of packets;

a determining step for determining whether the received data is print data or control data according to the used type of packet;

a first processing step for processing the print data if the received data is print data; and a second processing step for analyzing the control data and determining whether or not the control data contains an interrupt command if the received data is control data, wherein, in said receiving step, print data is received using one type of the at least two types of packets and control data containing the interrupt command is capable of being received using a different type of the at least two types of packets, and wherein in response to the interrupt command, reception or processing of print data is capable of being interrupted in said second processing step.

26. A method according to claim 25, wherein said receiving step receives the print data and the control data in parallel or in an interruptible manner by using each of the at least two types of packets.

27. A method according to claim 25, wherein, if the received data is control data, said second processing step analyzes the control data and determines whether or not the control data contains a command to return to an online state.

28. A method according to claim 27, wherein said second processing step returns a communication process to the online state in response to the command to return to the online state.

29. A method according to claim 25, wherein said second processing step interrupts analysis of the print data in response to the interrupt command.

30. A method according to claim 25, wherein the at least two types of packets are different between protocols.

31. A storage medium for storing a program that is read by a computer which controls a printing process, said program comprising:

a receiving step for receiving data from an external apparatus via a communication medium by using one of at least two types of packets;

a determining step for determining whether the received data is print data or control data according to the used type of packet;

a first processing step for processing the print data if the received data is print data; and a second processing step for analyzing the control data and determining whether or not the control data contains an interrupt command if the received data is control data, wherein, in said receiving step, print data is received using one type of the at least two types of packets and control data containing the interrupt command is capable of being received using a different type of the at least two types of packets, and wherein in response to the interrupt command, reception or processing of print data is capable of being interrupted in said second processing step.

32. A program for controlling a computer to perform the steps of:

receiving data from an external apparatus via a communication medium by using one of at least two types of packets;

determining whether the received data is print data or control data according to the used type of packet;

processing the print data if the received data is print data; and analyzing the control data and determining whether or not the control data contains an interrupt command if the received data is control data, wherein, in said receiving step, print data is received using one type of the at least two types of packets and control data containing the interrupt command is capable of being received using a different type of the at least two types of packets, and wherein in response to the interrupt command, reception or processing of print data is capable of being interrupted in said analyzing step.

* * * * *